(12) United States Patent
Worsley et al.

(10) Patent No.: US 12,443,861 B2
(45) Date of Patent: Oct. 14, 2025

(54) MULTI-STATION DECISION NETWORK

(71) Applicant: Rithm Software Inc., Lindon, UT (US)

(72) Inventors: Christopher Worsley, Alpine, UT (US); Ryan William Johnson, Alpine, UT (US); Jeffery Theodore Stockett, Lehi, UT (US); David Roy Watson, Jr., Pleasant Grove, UT (US); Austin Paul Bagley, Mapleton, UT (US); Logan Brent Uibel, Vineyard, UT (US)

(73) Assignee: Rithm Software Inc., Lindon, UT (US)

( * ) Notice: Subject to any disclaimer, the term of this patent is extended or adjusted under 35 U.S.C. 154(b) by 619 days.

(21) Appl. No.: 17/931,736

(22) Filed: Sep. 13, 2022

(65) Prior Publication Data

US 2024/0086742 A1    Mar. 14, 2024

(51) Int. Cl.
   *G06N 20/00*   (2019.01)
   *G06F 9/50*    (2006.01)
   *G06N 5/04*    (2023.01)

(52) U.S. Cl.
   CPC .............. *G06N 5/04* (2013.01); *G06F 9/5077* (2013.01); *G06N 20/00* (2019.01)

(58) Field of Classification Search
   CPC . G06N 5/04; G06N 5/01; G06N 20/00; G06F 9/5077
   See application file for complete search history.

(56) References Cited

U.S. PATENT DOCUMENTS

| | | | |
|---|---|---|---|
| 2002/0120924 A1 | 8/2002 | Miloushev et al. | |
| 2019/0388787 A1 | 12/2019 | Padmanabhan et al. | |
| 2021/0249002 A1 | 8/2021 | Ahmadidaneshashtiani et al. | |
| 2021/0334671 A1 | 10/2021 | Minsky et al. | |
| 2021/0342129 A1* | 11/2021 | Scolnick | G06F 8/38 |
| 2021/0350262 A1* | 11/2021 | Song | G06Q 20/4016 |
| 2023/0297912 A1* | 9/2023 | Agarwal | G06Q 30/04 |
| | | | 705/7.25 |

FOREIGN PATENT DOCUMENTS

CN    114915460    8/2022

OTHER PUBLICATIONS

Search Report and Written Opinion for PCT/US2023/032301, mailed Dec. 26, 2023.

* cited by examiner

*Primary Examiner* — Brian W Wathen
(74) *Attorney, Agent, or Firm* — Knobbe Martens Olson & Bear LLP

(57) ABSTRACT

Systems and methods are provided for creating and executing a decision network that includes a number of stations configured to operate with respect to an instance of a document, container or other object. A user interface may be presented to a user that includes selectable options for configuring and connecting stations within the decision network, and for establishing executable logic for each station to modify or create data within fields of a container instance. Different stations in the decision network may be assigned different permissions with respect to the container. Individual stations in the decision network may be configured to determine a prediction or probability based on data accessible to the given station, where the prediction or probability of one station may be based in part on an earlier prediction or probability determined at another station of the decision network.

18 Claims, 42 Drawing Sheets

Station

Station Name
Auto-Naming Convention

Connections
Previous Station (s)
Connected Flow Station(s)

Data Fields
Ordered List
Attributes for each: Descriptions, Type, RegEx Validation, Editable, Required
Previously Available/Visible List
Previously Hidden/Encrypted List

Roster Access
Personas
Granular Privilege Levels
Chained Station?

Station Group
Membership in Which Group(s)

Related Stations
Parent Hierarchy
Sibling Hierarchy
Children Hierarchy

User Experience
Dedicated User Experience for documents

Powers
Data acquisition sources
Data manipulation/computation rules

Flow Logic
Rules for each flow path

Station Captured Analytics
Time in Station, Default Priority, Last Update

FIG. 5

MULTI-STATION DECISION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

There exists a wide variety of industry-specific or domain-specific software and/or hardware solutions for computer-assisted decision making, often tailored to specific types of decisions within an industry. For example, one automated decisioning solution may have been specifically developed for use cases within the oil and gas field, while another automated decisioning solution may be tailored to use cases within the product manufacturing field. There are also existing machine learning models that may be industry agnostic and flexible to be trained for use in various industries or domains, but are not well suited to situations where an operator desires a system to implement a deterministic decision-making process that may enable an expert or other entity to leverage domain-specific knowledge in setting up the given process or system.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where:

FIG. 5 illustrates an example station template in which a station is defined, including processes, data, logic, connectivity, and a decision flow within the template.

DETAILED DESCRIPTION

Figure 1:
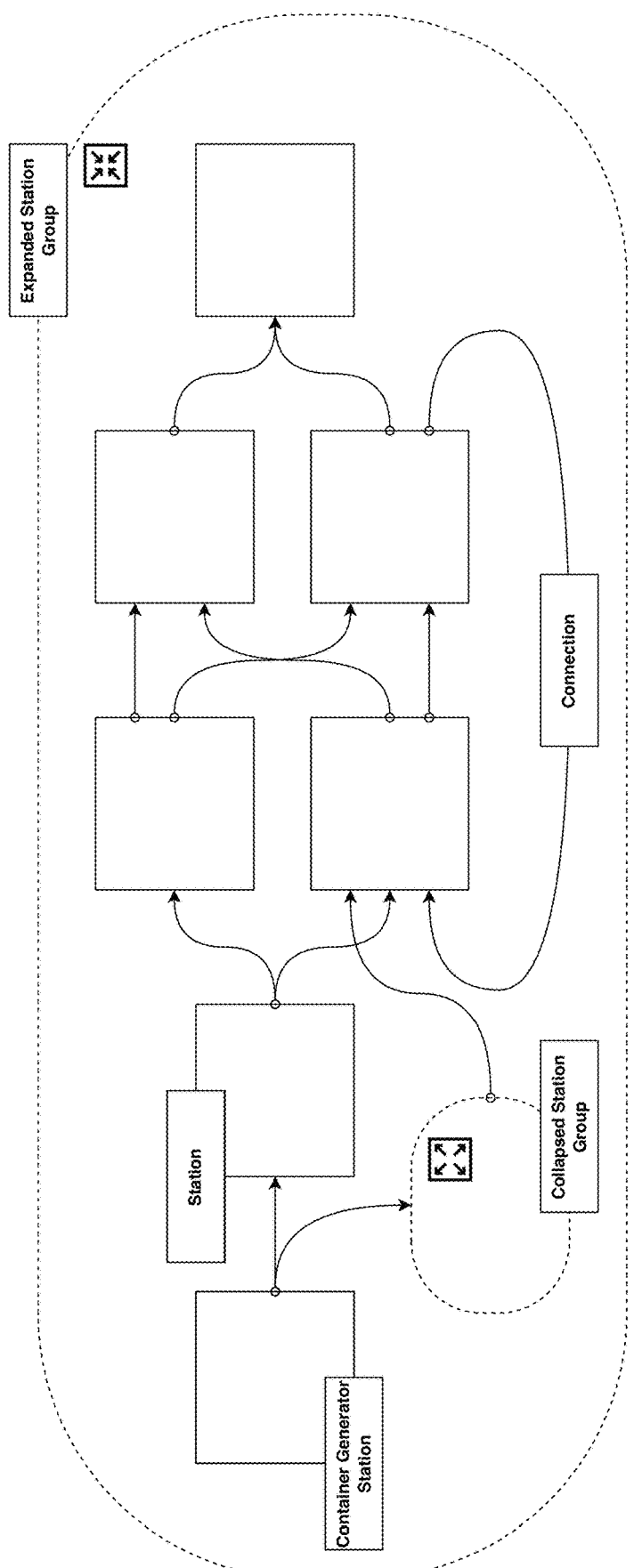
FIG. 1 is a high-level network diagram showing components of a decision network ("DN") comprising station groups (collapsed and expanded), stations, a container generator station, and directional connections.

Automated decision-making systems have been developed in the form of a wide variety of industry-specific or domain-specific solutions. However, existing systems are not typically developed with a unified approach to determining decisions dynamically and predictively across an entire ecosystem of software, users, hardware, and networks. As will be described herein, the ability to link many decisions to the outcome of many other decisions, while applying any number of constraints, allows a decision network utility to provide high accuracy, timely response, an improved chance for management of change, and predictability. By connecting a full spectrum of individuals, teams of individuals, and even cross organizational resources into this decision network, complete visibility based upon applied privilege and security level empowers optimal decisions. Whenever a better decision or improvement of decision making is detected, the system can be modified according to management of change rules to enhance and refine the decision-making network over time. Such a decision network, in some embodiments, is constantly monitoring for blockages, inefficiencies, unanticipated outages, and/or resource shortages, and then alerting those with specific know-how, access privilege, and additional resources, to drive better systemwide outcomes based upon goals established with respect to the decision network. Through the integration of third-party systems and data, the decision network may bring together any outlier resource and makes it an integral part of the decision network, in some embodiments.

Systems and methods are described herein for generating and executing a decision network or Bayesian network that connects any number of disparate micro-decisions into a larger contextual model to achieve improved outcomes. Each object within the network may be represented as a container or document that includes a flexible and dynamic collection of data fields and state information that traces the journey of each object through its decision path within the network. An instance of the decision network may assist individuals and teams to integrate data from available sources and allows certain users (sometimes referred to herein as subject matter experts (SME)) to orchestrate business rules that form conditional decisions at each network node. By combining predictive heuristics, such as utilizing Bayes' Law (BL), individual decisions within the network can be influenced based upon past patterns and current trends. SMEs can determine the extent to which predictiveness should influence decisions within the network at a granular level by applying Bayes' Law or other model(s), heuristics or rules where applicable. The network may ensure proper governance and management of change by granting certain permissions to only subsets of an organization's users at each station in the decision journey within the network. The resulting data-driven decisions may be used to obtain desired outcomes across a complex organization with varied objectives and missions. Any set of network nodes called stations herein can be combined into a hierarchical abstraction unit that may be referred to herein as a station group. Station groups can be nested and afford a visual and logical structure around which complexity can be hidden or exposed on demand, according to some embodiments.

Decision Networks

A Decision Network ("DN") as described herein, according to some embodiments, provides utility to any individual, team, or extended enterprise by connecting different modalities that contribute to decision making across an extensive number of related and even loosely related information sources. The DN can be visually created to reveal how all modalities come together and interconnect into a simplified model thereby enabling any number of individuals to collaboratively express all or part of the structure. As shown in FIG. 1, the major visual expression can be established with only a handful of unique symbols including stations which serve as network nodes, connections with directionally tie stations together into logical process flows, and then a visualization referred to as a Station group herein that allows for the hierarchical segmentation and abstraction of the complexity associated with large DNs (e.g., including many connected nodes or stations). The components of a DN in a given embodiment may vary, as will be further described herein with respect to specific examples. Generally, the components of a DN as described herein may be physically located within the same computing system or different computing systems from one another (e.g., a station may be a virtual or logical component implemented by a computing system, without necessarily having dedicated hardware that is separate from the hardware that implements other stations in the same DN).

The above components work together to express visually how the flow of process, information, resources, and raw data can drive infinite interconnected decisions that lead to any number of outcomes across one or all processes being considered within the ecosystem. By allowing a visual development of the DN in this simplistic way, independent processes can be created and utilized and then later connected and caused to interact as simply as adding the connection between disparate branches of the network.

A process to manage incoming sales leads from a variety of sources can be created as a series of lead workflows or journeys, as shown in FIG. 1, that ultimately lead to a process for validation of the lead. This could be represented by showing several connected stations from each lead source (email campaign, social media campaign, website forms, tradeshow floor, etc.). Each process may capture the relevant data and validation into a centralized station where all lead data from the diverse systems may then provide historical meta-data from predictive analysis that may rank and apply rules that could assign these leads to various teams and individuals to follow up on. Some follow-ups might be deemed best done via digital automation (which may be a synchronous process), while others might be merged with pre-existing leads into the same organization, with a human (which may be an asynchronous process). Ultimately, all individual leads may flow into a sales process that could provide best-practice rules to achieve the statistically highest outcome. These rules may effectively be a blend of the team's standard operating procedure and machine learning of having processed thousand or even millions of leads over time.

As this process operates within the sphere of its own departmental structure, it becomes clear that other teams within the organization both need data from the process, as well as can drive better data into the process thereby improving the long term out comes. In this example, the events team might be able to mine the results and increase the data points that they drive into the top of the event funnel lead process, and in addition, make recommended follow-up strategies embedded in deeper data driven process in the later stages of the lead contacting phase of the overall lead journey, where it applies solely to event driven leads.

Building a Decision Network

There are a number of factors that contribute to or supplement the utility of a decision network built as described herein, which may include the below factors in some embodiments.

1. The Impact of Connected Decisions May be a Good Predictor of Success

Not every question and answer can easily be determined to be causal in achieving ideal outcomes in a decision process. Still, when answers are timely (such as when they are presented in the best order), and tuned to contribute to later questions clarity, they provide significantly greater context in the process. Context for layered decisions becomes increasingly relevant and deterministic based upon order. When the results of many distinct and repeated decision-making events are repeated, the system or network trends towards greater accuracy and an improved or even an ideal outcome.

Figure 27:
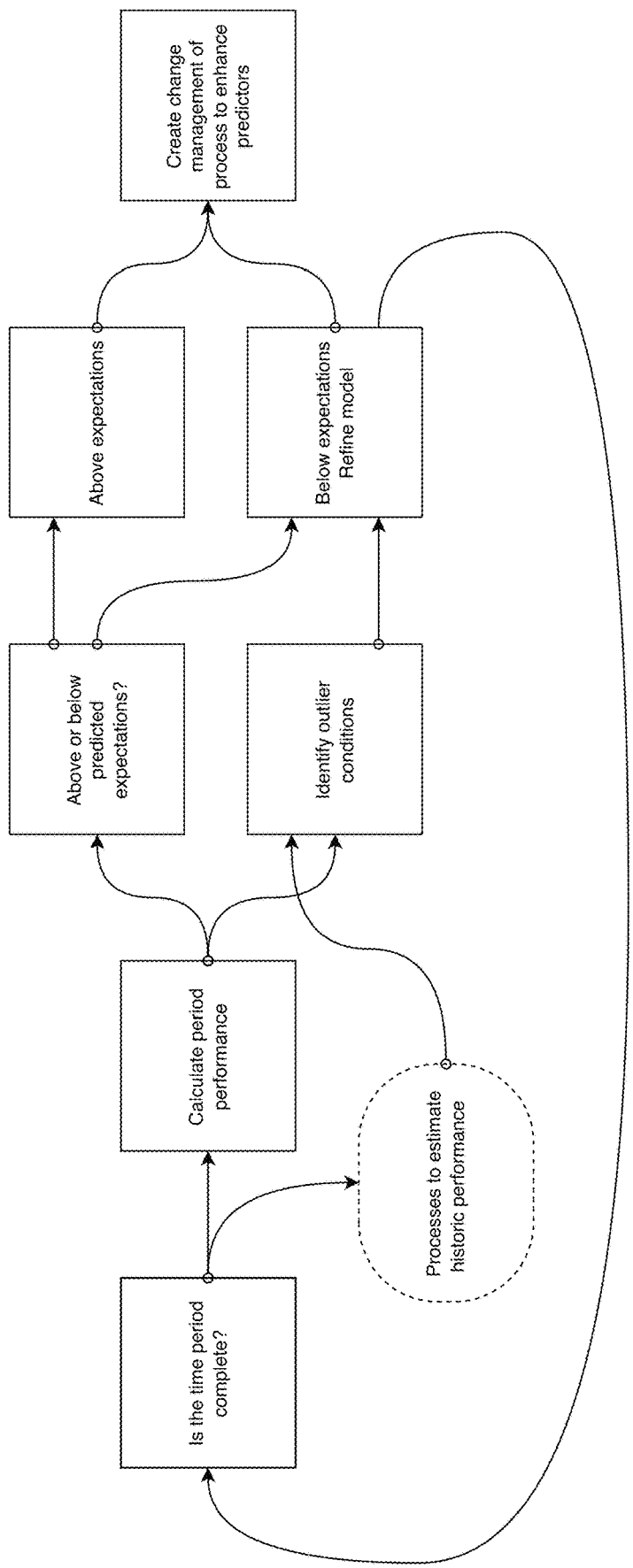
FIG. 27 provides an example flow diagram illustrating that one question can lead to an iterative series of additive questions, which constantly refine the decisions to be made and achieve multiple related outcomes as the context changes over time, such that the logic of a decision changes as more and more instances of the question are applied to the decision network.

FIG. 27 provides an example flow diagram illustrating that one question can lead to an iterative series of additive questions, which constantly refine the decisions to be made and achieve multiple related outcomes as the context changes over time, such that the logic of a decision changes as more and more instances of the question are applied to the decision network. The more the refinement, the better the eventual efficiency of the process, according to some embodiments.

2. Real-Time and Democratized Decision Network Building and Refinement can Leverage Collective Intelligence A typical modern organization depends on a myriad of specialized skills, experience, and ownership/accountability to achieve the best result. When all the best contributors can contribute to the definition and constant improvement of every micro decision, the network of these factors becomes idealized. Since new data availability and process improvement provides a constantly changing landscape, the ideal decision that combines intelligence, data elements, and logic is always changing.

Figure 28:
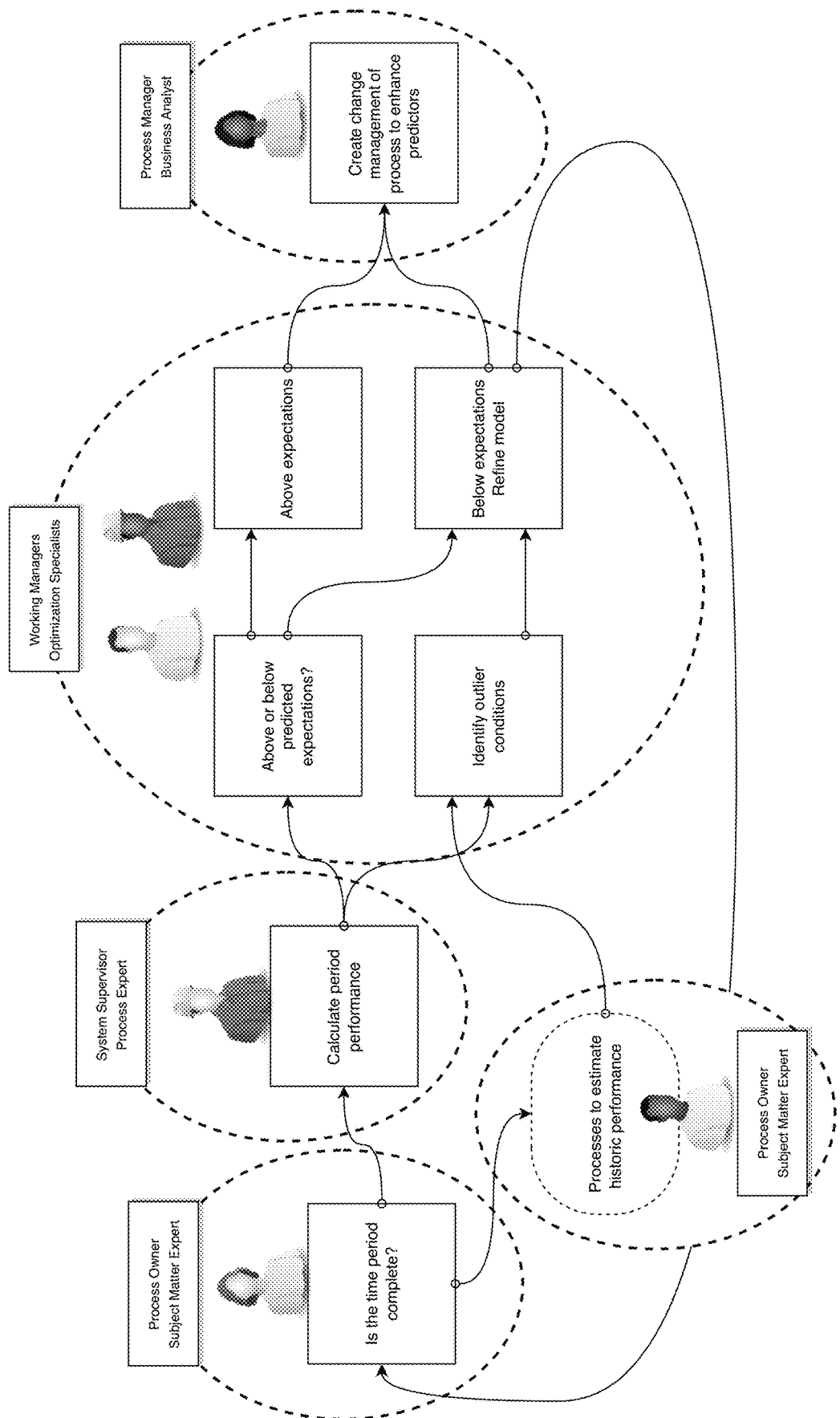
FIG. 28 is an illustrative graphical diagram showing that various members of an organization may own or control their own domain of the decision network, including what they expect as input and what logic is valuable within their specialty, although subject matter experts may have visibility into more than just their own portion of the decision network.

FIG. 28 shows that various members of an organization may own or control their own domain of the decision network, including what they expect as input and what logic is valuable within their specialty, although subject matter experts may have visibility into more than just their own portion of the decision network and can refine their process and understanding based upon the causal effect of decisions in their spaces. With macro visibility and micro control, DNs, in some embodiments, provide the benefit of collective intelligence that may otherwise be lost in the noise of a complex organization.

3. Analyzing the Past Performance of a DN can Lead to Improvements by Minimizing Uncertainty and Understanding the Weighted Impact of Each Data Point, Application of Logic Formula, and/or the Impact of Interconnected Decisions Humans often use their best guess logic when making one decision, however, may not always understand the previous decisions, data available, or applied logic that proceeded the determination at hand. That means that humans may fail to quickly assess all the predictive intelligence that time and repeatability in the moment of decision. DNs empower the gift of constantly improving application of every previous choice and impact of small, seemingly irrelevant conditions.

Figure 29:
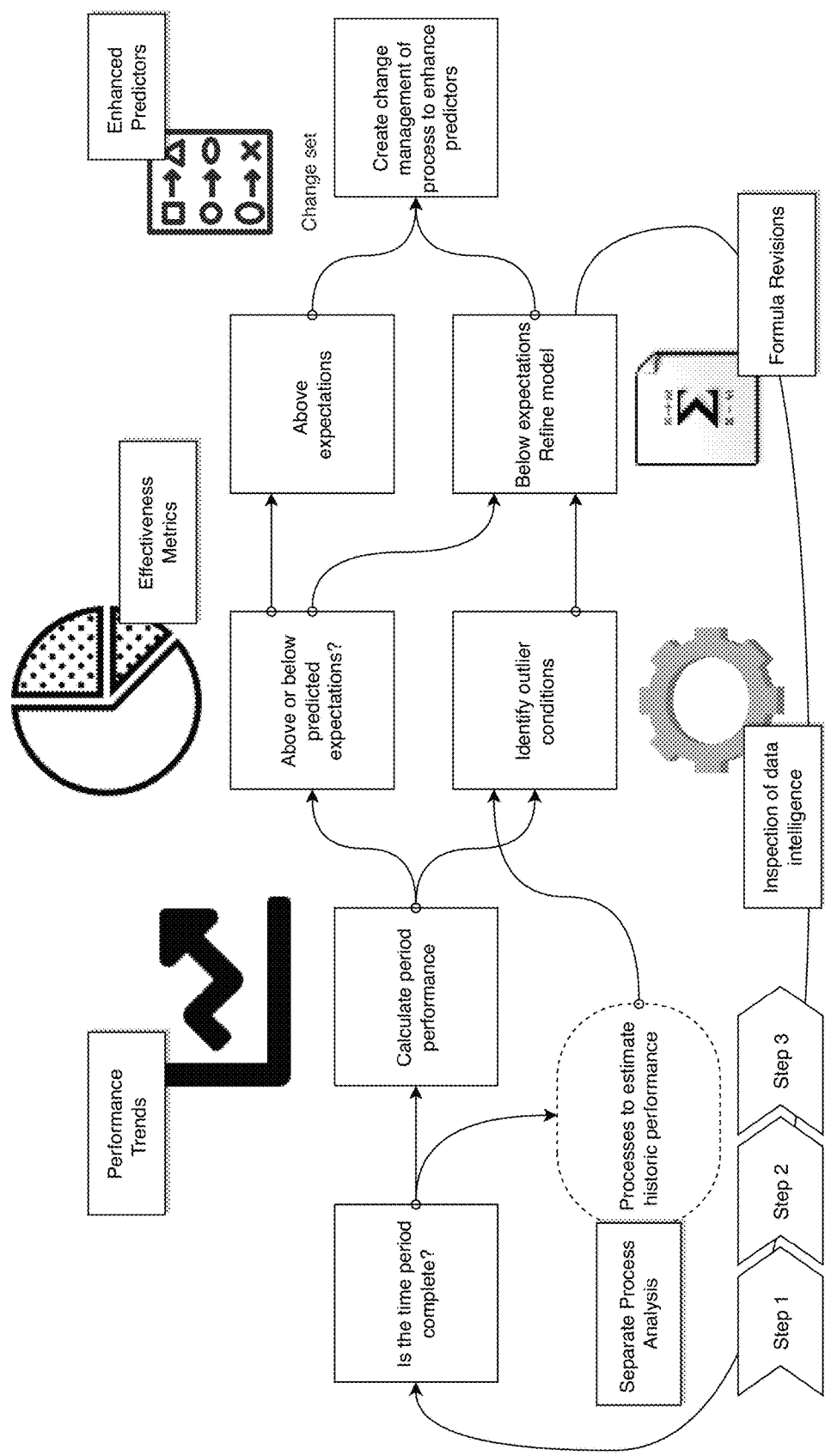
FIG. 29 is a flow diagram illustrating that each collection of nodes within a decision network can harvest important analytics as chosen by one or more orchestrators to refine and train the decision process to be more efficient, more timely, more accurate, or otherwise improve outcomes.

FIG. 29 is a flow diagram illustrating that each collection of nodes within a decision network can harvest important analytics as chosen by one or more orchestrators to refine and train the decision process to be more efficient, more timely, more accurate, or otherwise improve outcomes. Visibility and data sharing may help past performance to dictate future performance and gauge the weighting for each criterion in its application to the improvements.

4. Data Connected in Real Time to the Best Source Enhances the Speed and Reliability of its Use Interdepartmental specialties create the best answers but often run on their own cadence and are not available to provide the data insights that impact external decisions. In a DN, architects and decision owners can connect those points in real time to the decisions dependent upon them. Time savings and no guessing accuracy impact all connected downstream decisions rather than the use of anecdotal evidence or outdated rules. In the network, subscribers to upstream complex processes can consume relevant outcomes according to proven and improving standards.

Figure 30:
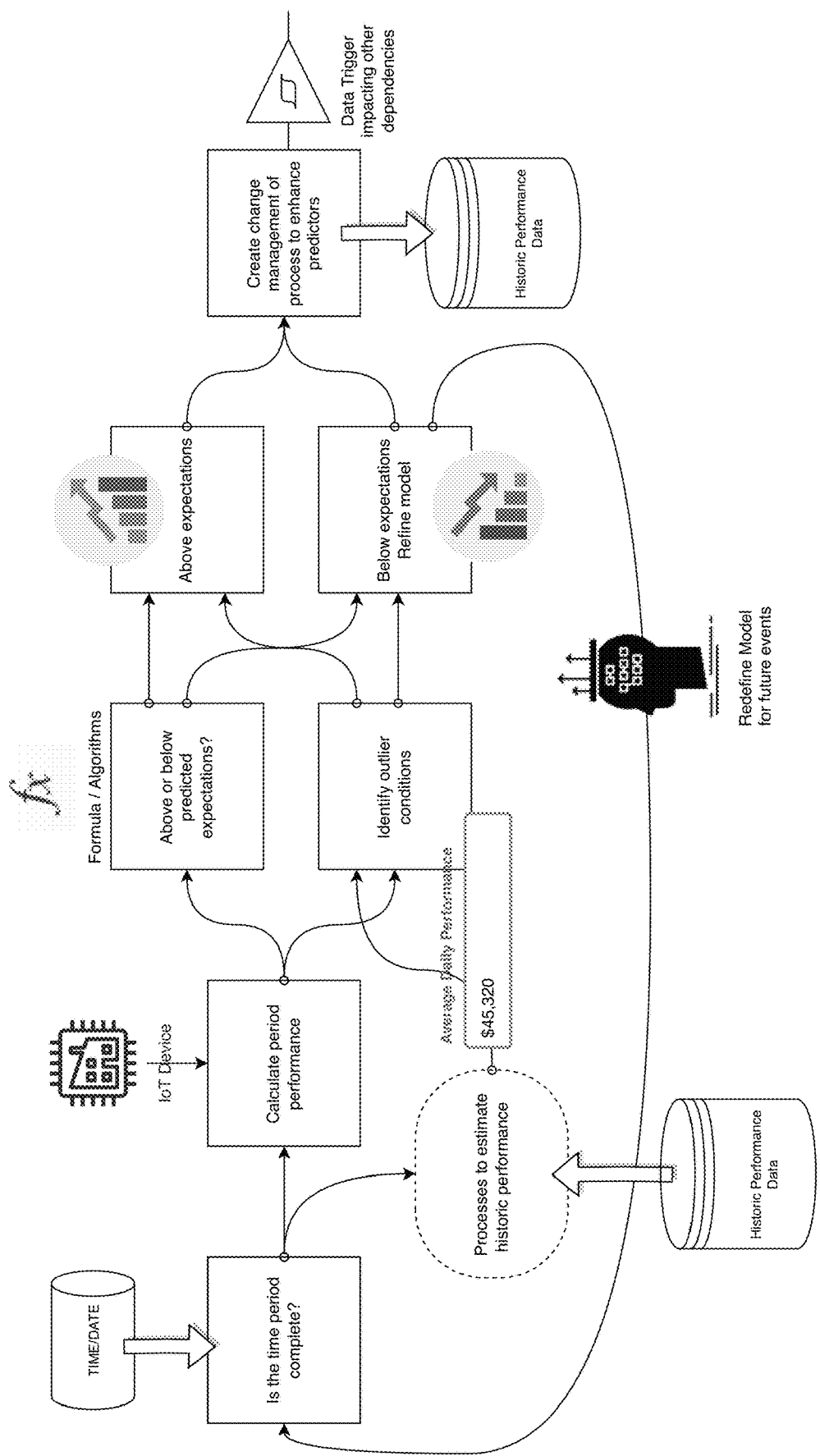
FIG. 30 is an illustrative data flow showing how data entering a decision network from real-time as well as asynchronous sources may combine at the right moment in the decision process to provide real time assessments and allow constant tuning of the decision process, by the right people, in the right timeframe to capture the immediate benefits of data and intelligence.

FIG. 30 is an illustrative data flow showing how data entering a decision network from real-time as well as asynchronous sources may combine at the right moment in the decision process to provide real time assessments and allow constant tuning of the decision process, by the right people, in the right timeframe to capture the immediate benefits of data and intelligence. With each connection in the network come any number of opportunities to direct tasks and acquire needed information. In many decisions, the reliability of data is highly time-sensitive, and greatly benefits from connected sources.

5. Granular, Connected Analytics that are Captured while they Happen, Instead of Looking Backwards in Time, Provides Clearer Organizational Visibility Leading to More Informed Decisions When people work connected to the data and decisions that follow priority, the resulting insights exposed throughout the team and organization empowers more intentional process improvement and understanding of what drives short- and long-term outcomes.

Figure 31:
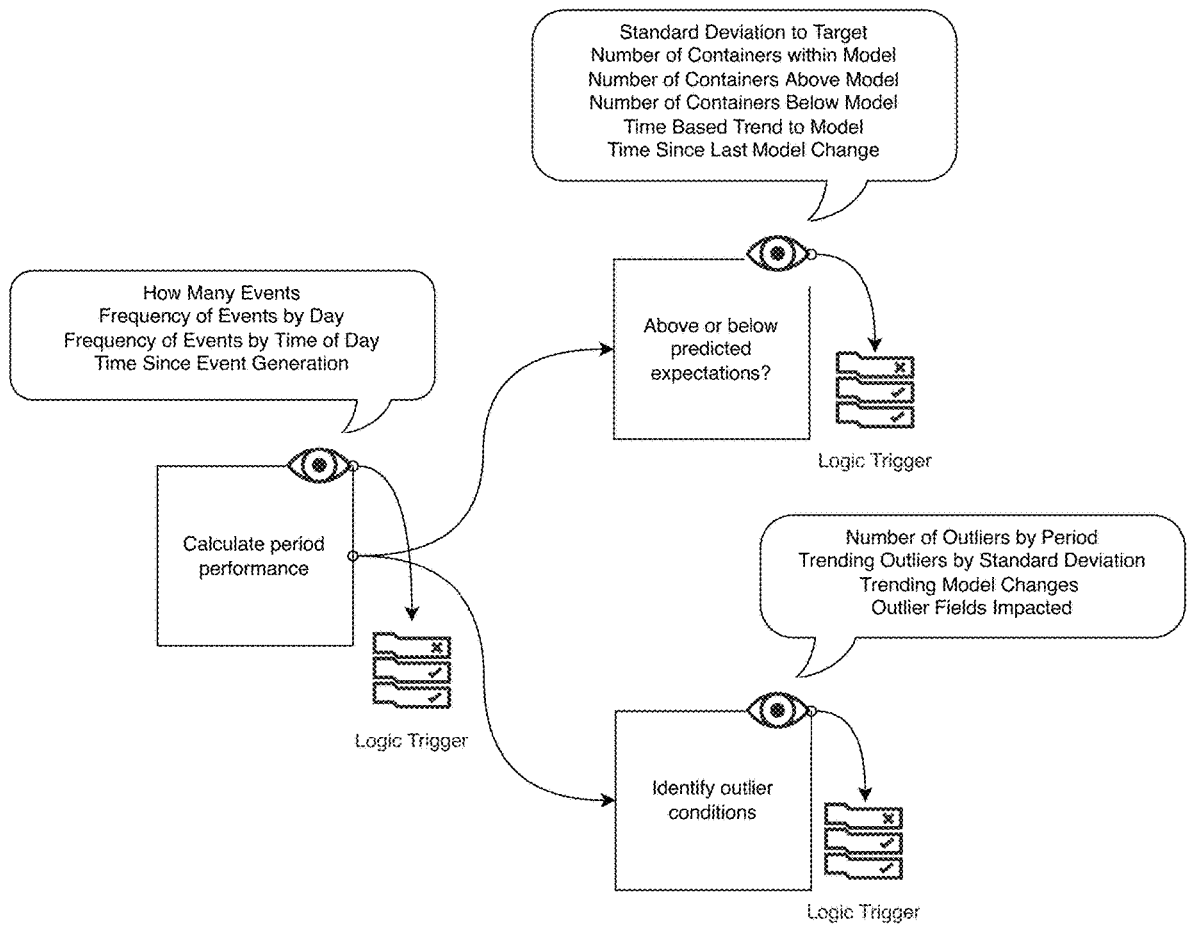
FIG. 31 is a flow diagram illustrating observable data related to a station, in one embodiment, whether traffic or computationally generated as a roll-up on statistical trends or frequency, that may empower an orchestrator of one or more decisions in a decision network via logic triggers.

FIG. 31 is a flow diagram illustrating observable data related to a station, in one embodiment, whether traffic or computationally generated as a roll-up on statistical trends or frequency, that may empower an orchestrator of one or more decisions in a decision network via logic triggers.

Specific Steps in a DN

Figure 2:
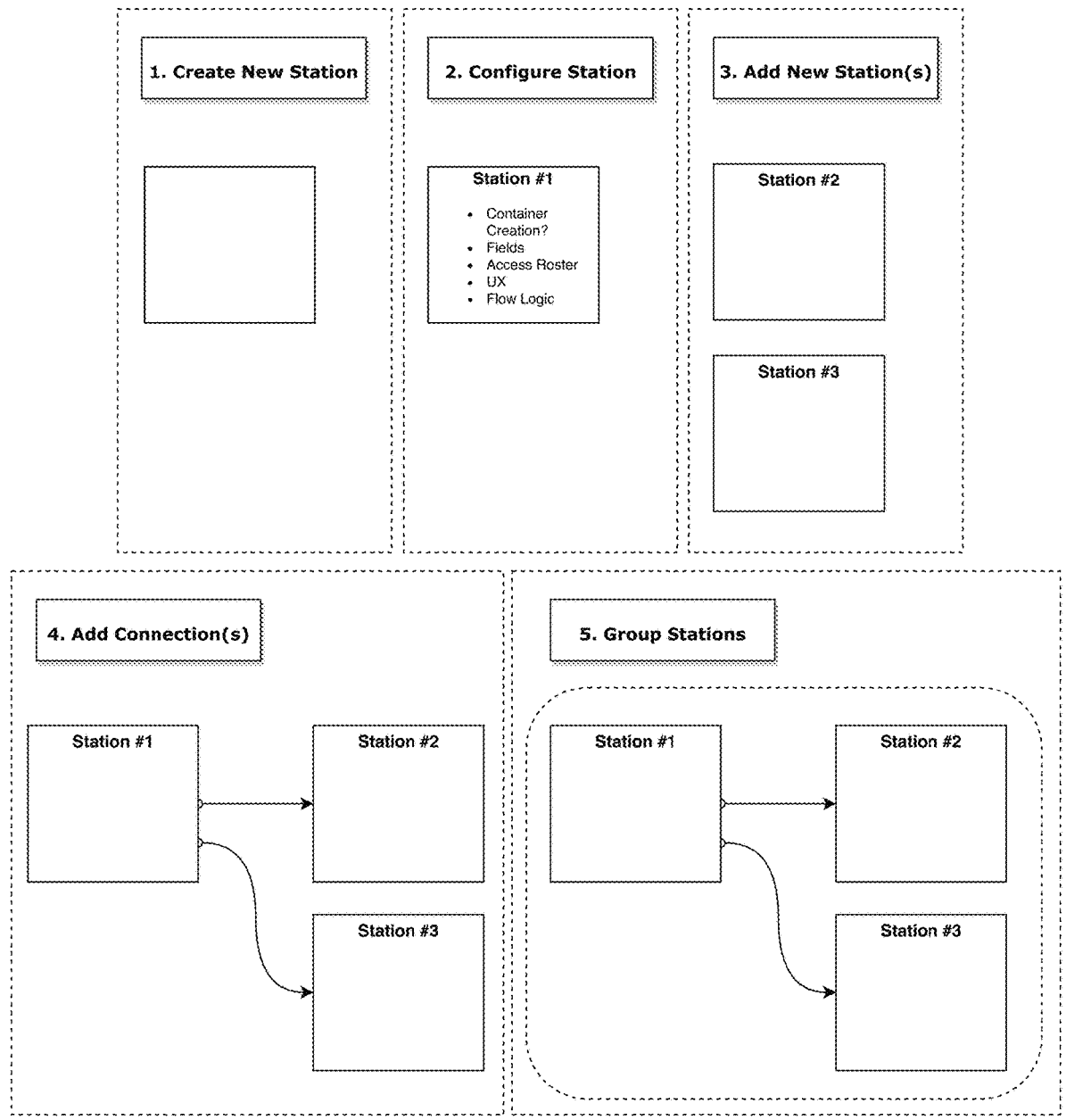
FIG. 2 is a block diagram illustrating steps to build a connected decision network in a simplified form, according to one embodiment.

FIG. 2 illustrates examples steps to build a connected DN, according to some embodiments. These steps may include identifying a unit of decision, called a Station herein, that encompasses the gathering of data, such as automatically from a variety of sources, and then establishing rules that allow a decision to be made that will indicate where the journey of the process will move next. This step 2 of FIG. 2 in the build process may involve a configuration. Connecting these individual decision nodes based upon the potential decision journeys is the next step in the process shown as step 3 in FIG. 2 as additional stations are added to the journey. Over time, additional conditional branches can be added or removed from each journey step as needed to optimize the outcome. Connections, as shown in step 4 of FIG. 2, show that connections may be ordered or directional in nature, though a connection may flow back upstream in the journey, skip decision nodes downstream, or even terminate with no future flow. Once the series of nodes or stations is ready to be abstracted into a Station Group in step 5 of FIG. 2, it may be assigned a name and owner so that visualization and administration can be done at this level of the DB. The overall DN is then the connected version of all individual components that make up this build process, in some embodiments.

Cross-Organizational Networks

Figure 3A:
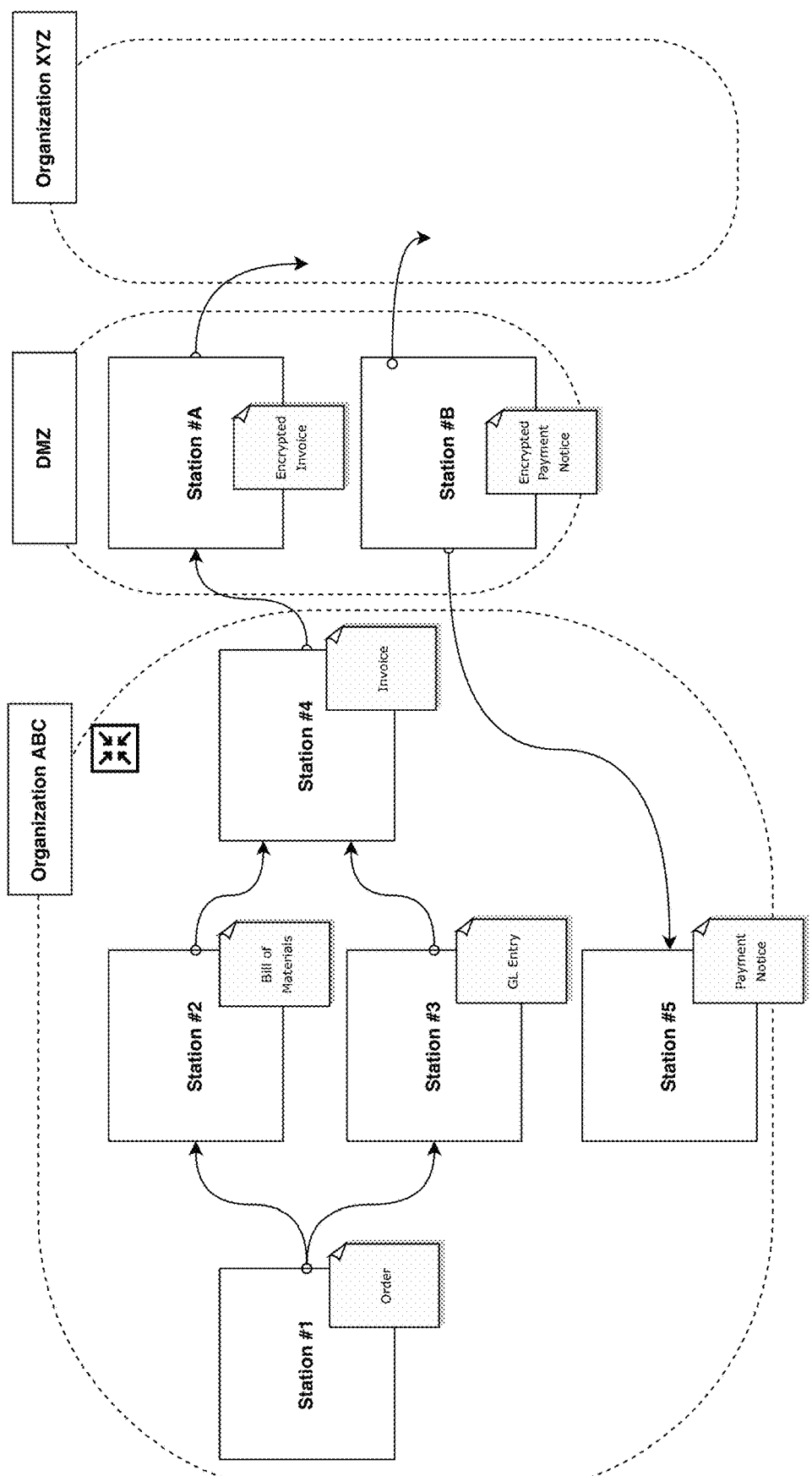
FIGS. 3A and 3B depict components of cross-organizational decision networks, such as where components of the network reside virtually and/or physically across more than one organization or group while sharing processes and data securely, according to some embodiments.
Figure 3B:
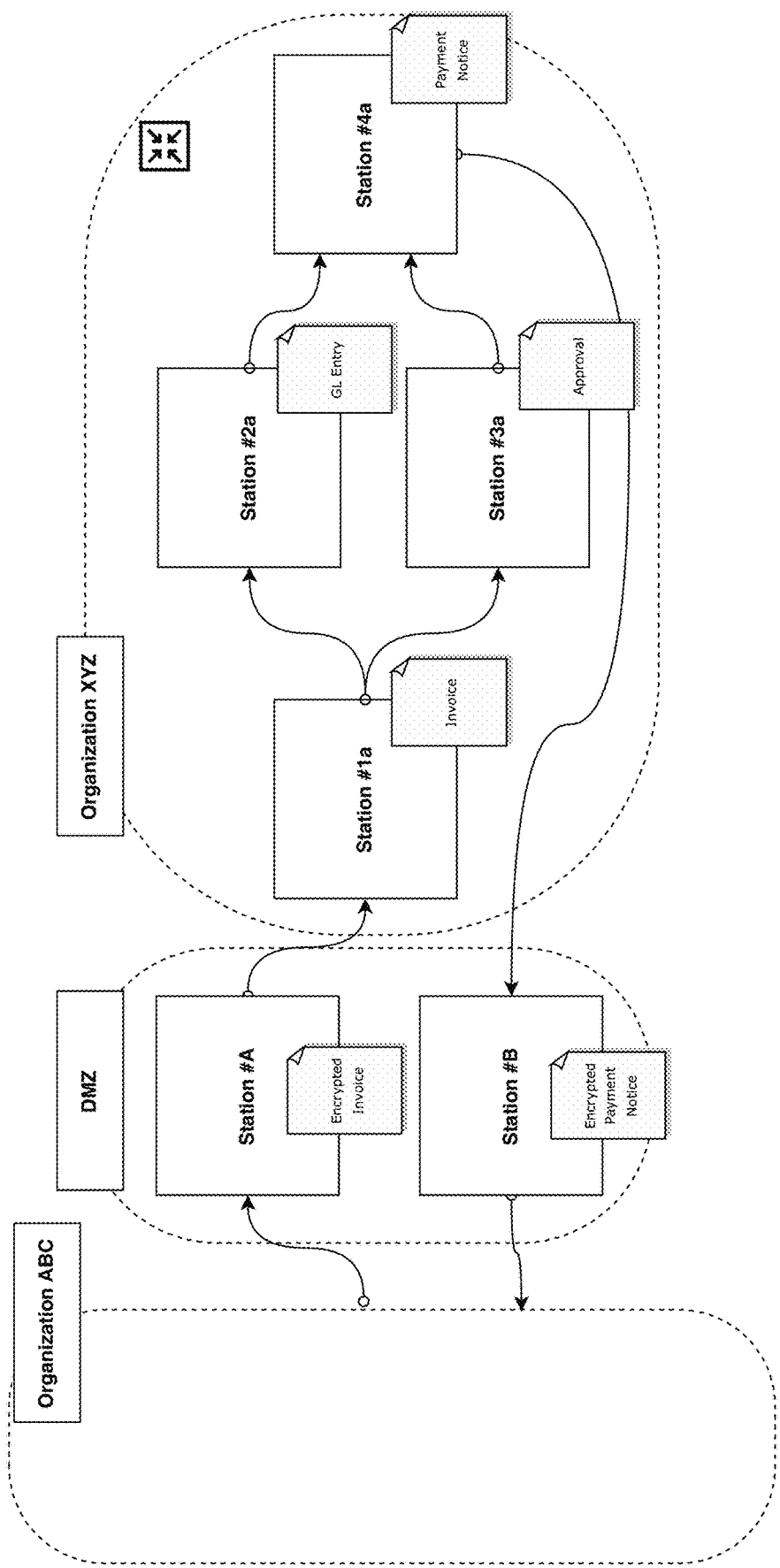
Figure 4:
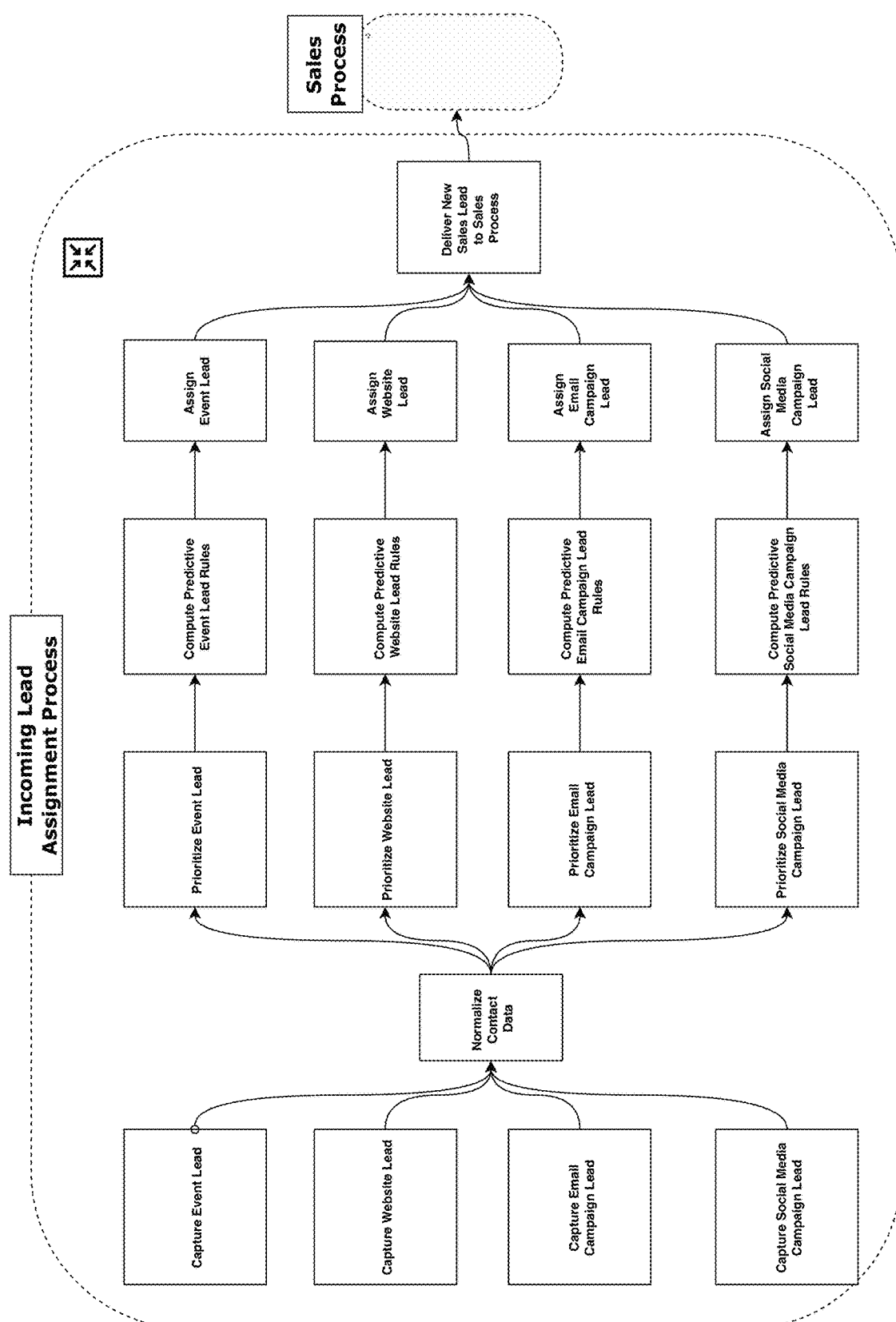
FIG. 4 illustrates a sample data flow or process related to a sales lead use case of a decision network.

As shown in FIGS. 3A and 3B, one organizational DN can connect securely to an external or outside DN through a process that may be referred to as a DMZ or "De-Militarized Zone" where data is shared and remains encrypted and secure for the owner of the data. By extending decisions from one organization into another, an even larger network (existing in the non-virtual world) can leverage the processes and data sharing required to make best choices and optimize outcomes across traditional boundaries. By agreeing on a shared and secured data model, one organization can include external data and real-time feedback into their own decisions, and then share those decisions and outcomes with a partner or trusted external relationship.

Traditional processes breakdown when inherent dependencies exist across these kinds of boundaries, and therefore predictability, control, and process logic cannot be leveraged. Inside a DN, these valuable decision components and relationships can be modeled and utilized to make better unified and adaptive decisions leading to greater long terms mutual success.

Configuring Stations

Station Templates

In the DN, the station is where all decision-related data, process, and logic is stored and implemented, in some embodiments. It becomes a template for how individual process and network structure is defined. This includes and is abstracted by category in FIG. 5:

Whom. What roles and named individuals can interact with, administer, view, and perform various functions at this level of the DN structure.

How. In what physical organization of the network does this station fit, i.e., connections into and from the station node, what station group(s) is this station a member of, details of analytics tracked and used within the station, and how do various user experiences connect to interactions at this level of the decision network.

When. Details of the timing of the activities that occur at this decision node in the network, are activities automated or asynchronous, and what triggers actuate the "what" that comes together to drive decisions.

What. This describes the details of each decision and includes the template containing data to be gathered, analytics from both external sources and internal intelligence, and the logic and rules that drive the formula for each decision.

Station Field Assignment and Validation

Figure 7:
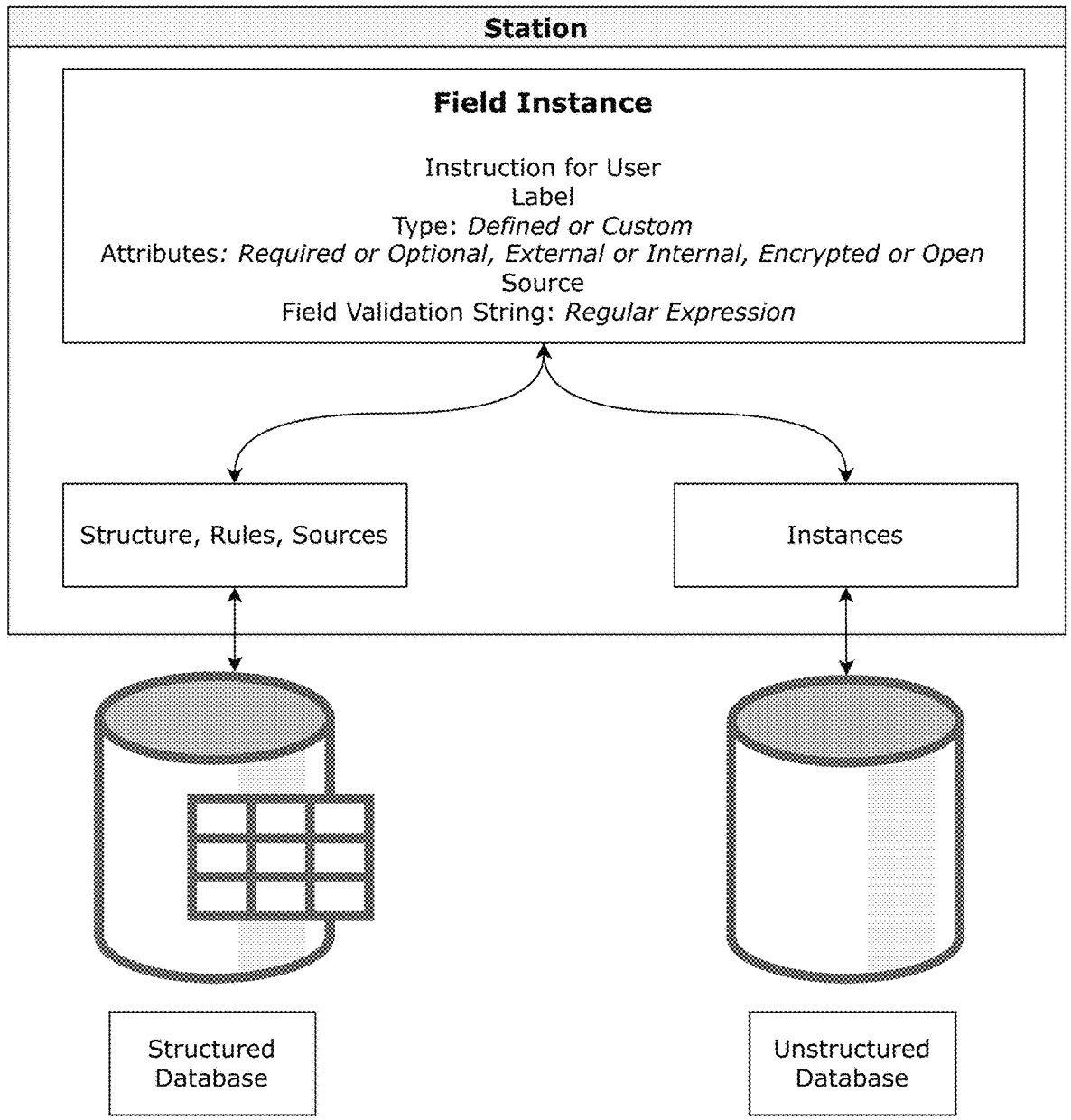
FIG. 7 illustrates example data flow of station field assignment and validation, according to some embodiments.

The data definition inside of each station is a set of discrete fields that can be described as typed storage for any kind of data that is pertinent for the decision process. Because there is no preset schema according to some embodiments, each station can include any new fields together with a description and a field definition regular expression used to validate the format of the field so that the contents can be consumed either visually or algorithmically by the decision logic, as illustrated in FIG. 7.

From station to station, new fields can be defined that add to the expanding dataset that describes each Container flowing along its journey from inception to final decision. In fact, the data being accumulated becomes snapshot over time of the journey instance in the decision-making process. This is valuable as machine learning and predictive theory can adapt and learn from each historical journey in its ever-improving refinement of outcomes. With granular security that allows or prohibits various users from viewing, changing, or inspecting these data fields, the station can limit access in a way that empowers highly secure and compliant decisions from exposing more than should be available in their journey.

The station template for fields and validation rules is supported by a structured storage mechanism for the field definitions, types, instructions, validation, source, and all flow logic rule. The data behind each field is then stored as a blob in any kind of unstructured repository (such as No-SQL, Data Lake, and/or others) and retrieved based upon Container identifier that is the reference to the repository.

Station Roster Access Model

Figure 6:
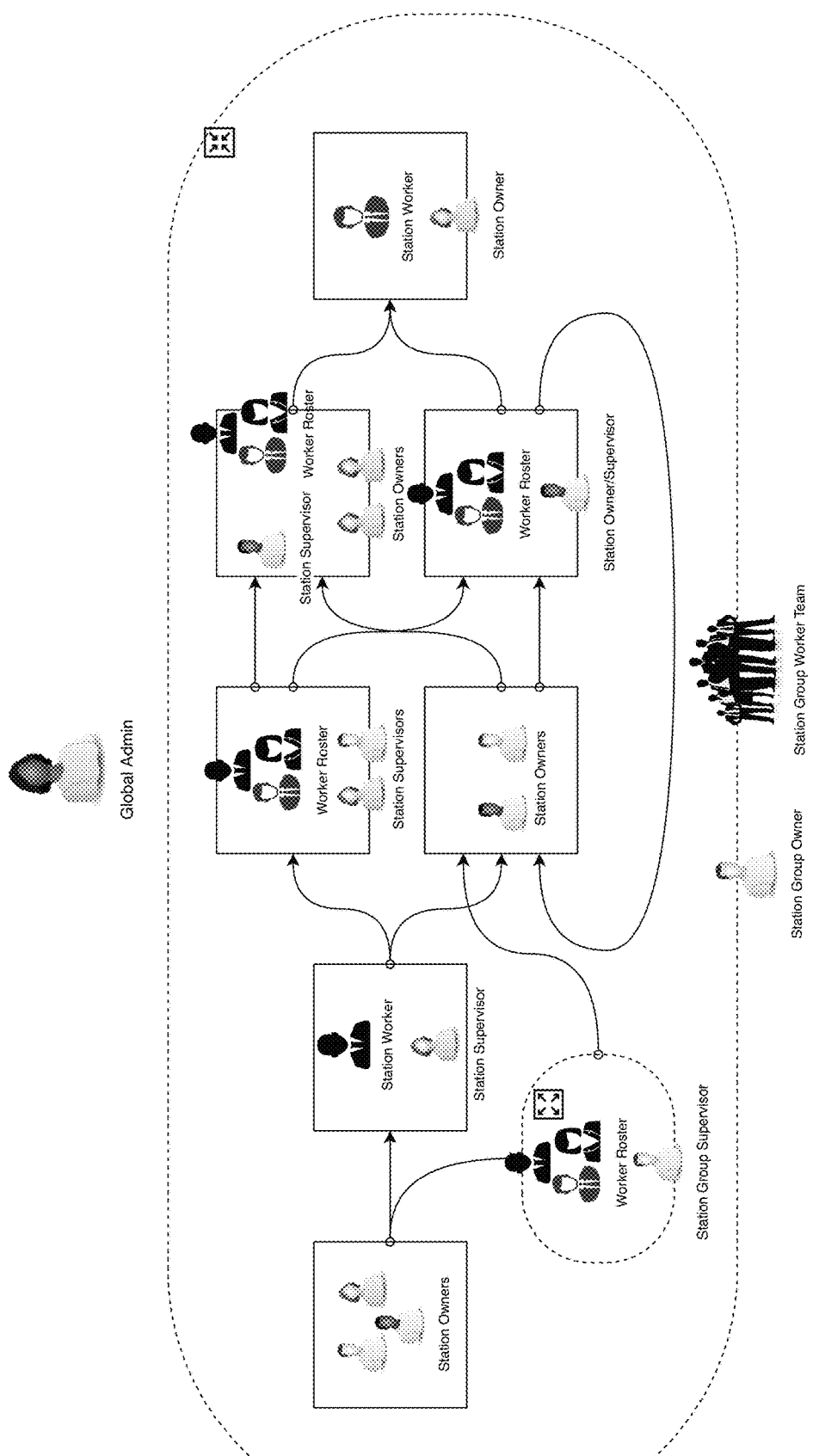
FIG. 6 illustrates how roles and user personas may be structured across a network to provide granularity of task, visibility, and ownership of the decision network.

Access to Stations administration and template structure is governed by a security model that affords individual and persona access and edit rights. Each station may contain lists of user IDs associated with access privileges, such as shown in FIG. 6, so that whenever viewing Containers, administrative views of stations, or even connected station groups inside of the map, the user experience will filter and expose only those components individual users have access to (such as to view, edit, update, etc.). In addition, these access filters can work on personas as well, meaning that individual user IDs don't have to be listed explicitly, only the persona group ID that will contain its own roster of individual user IDs. This allows the orchestrator of any portion of the DN to abstract users and roles while managing hierarchical and granular access to the network.

FIG. 6 illustrates owners at various levels of the structure (station, station groups and organizational level owners), as well as supervisors and workers having access inherited from a higher level in the hierarchy down through the nest structures of the network. In some instances and embodiments, granular named users can also be intermixed into this security structure so that access control is not solely limited to personas. Administration of access structure may follow a hierarchical model that sits virtually over the top of the DN structure, in some embodiments.

Station Logic Components

Figure 8:
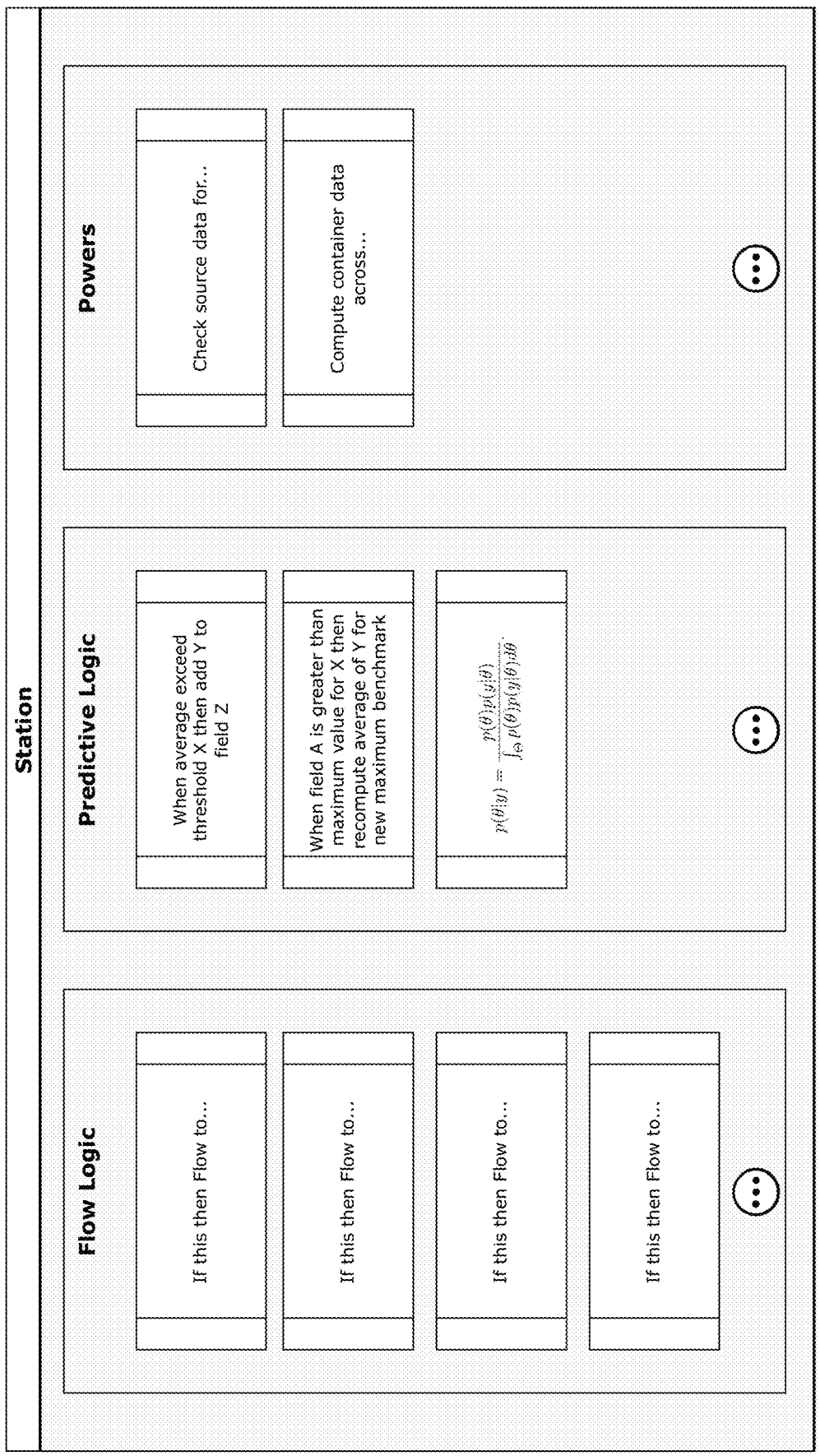
FIG. 8 illustrates example components of station logic, according to one example implementation, which includes flow logic, predictive logic, and powers.

The particularly powerful aspect in the orchestration of the decision network is encapsulated in utility referred to as station logic. Station logic, which may be implemented using components such as shown in FIG. 8, may incorporate three main categories of logic to drive the decision process. While not all are required for each decision, the configuration of each can contribute to the process of flowing a decision instance to the best next step in its logical journey.

Figure 14:
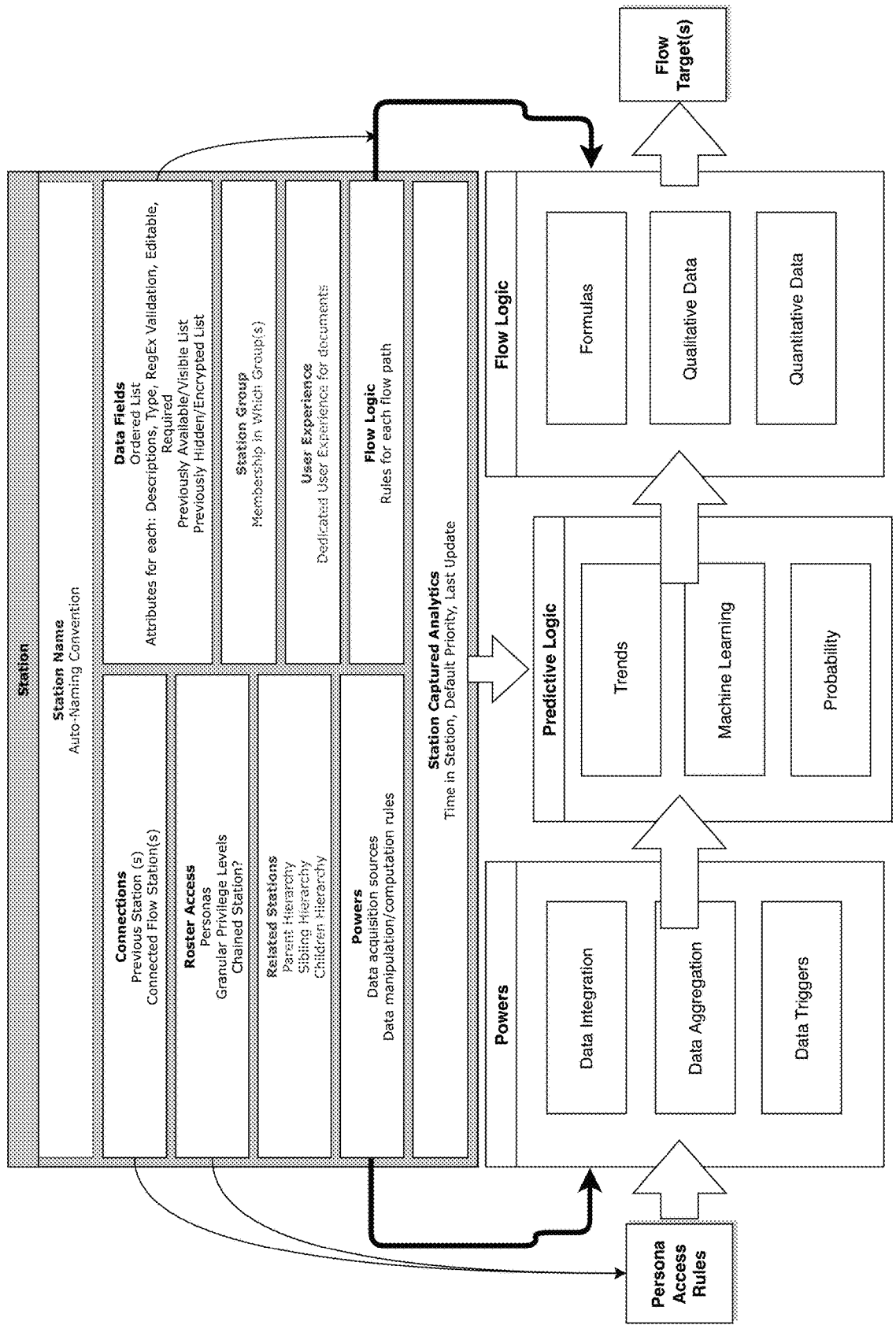
FIG. 14 is an example diagram depicting data flow and operations for establishing rules for container flow relative to a station in a decision network, and how powers, predictive logic and flow logic may interact to lead to a flow target or decision.

Administering these logic components is shown in FIG. 14 for establishing or orchestrating the various components together to flow Containers from the station level.

Flow Logic

At the foundation is the Flow Logic, which incorporates rules that pull from data aligned with each decision instance that is part of a flowing Container. The administrator has the role of orchestrating which kinds of logic play into the dynamic branching associated with the station. In this way, any number of formulas can be applied to create a logical decision.

Example

If A>B and C<D, then Flow to Station 3
else if A<=B or A+B>C and D>C, then flow to station 4
else if A+B>D and C>=D, then flow to station 5
else flow to station 6 and 7

Figure 18:
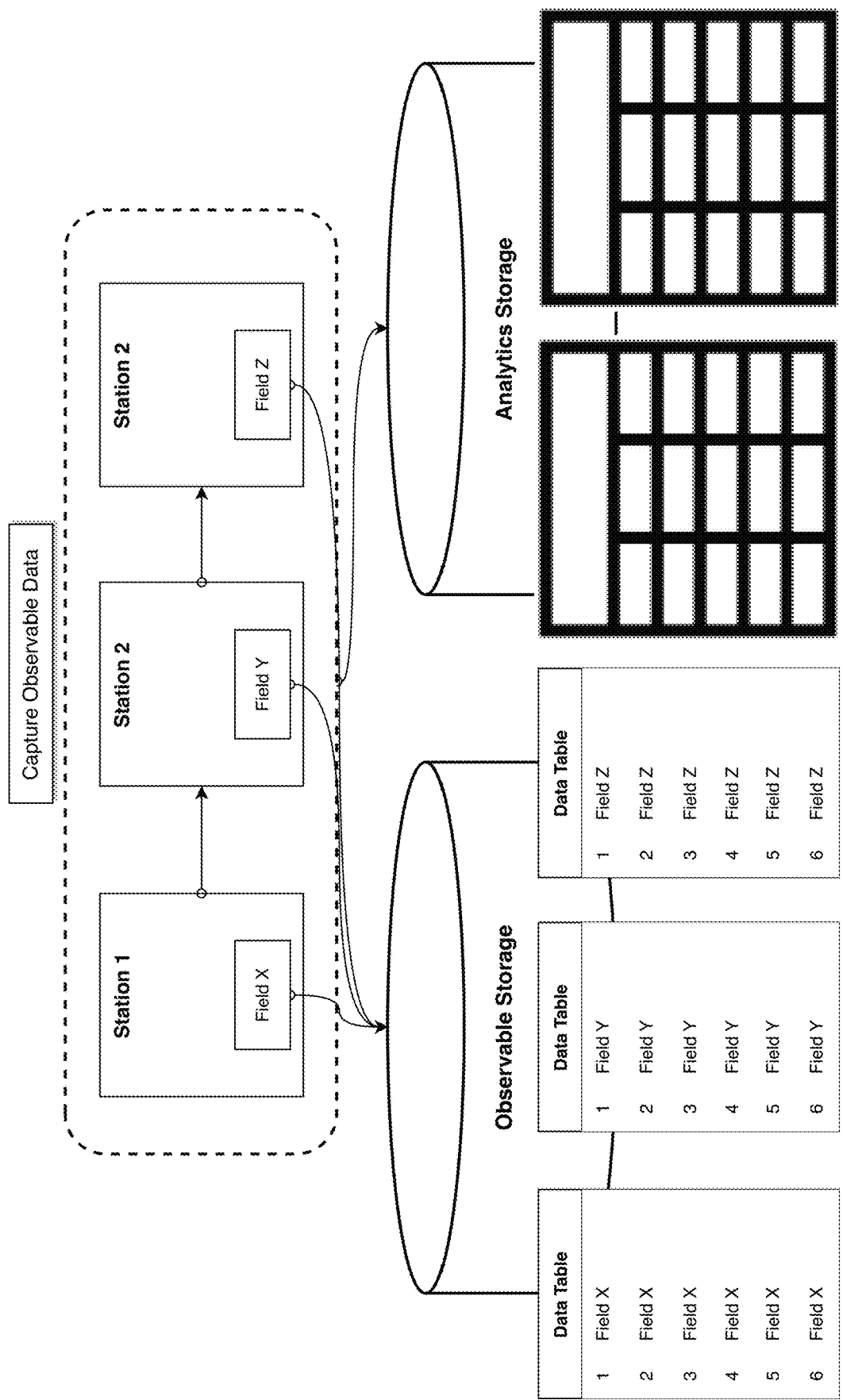
FIG. 18 visually depicts example predictive data capture whereby observable data elements may be captured along with the analytics of observable processes that apply to each data element.
Figure 19:
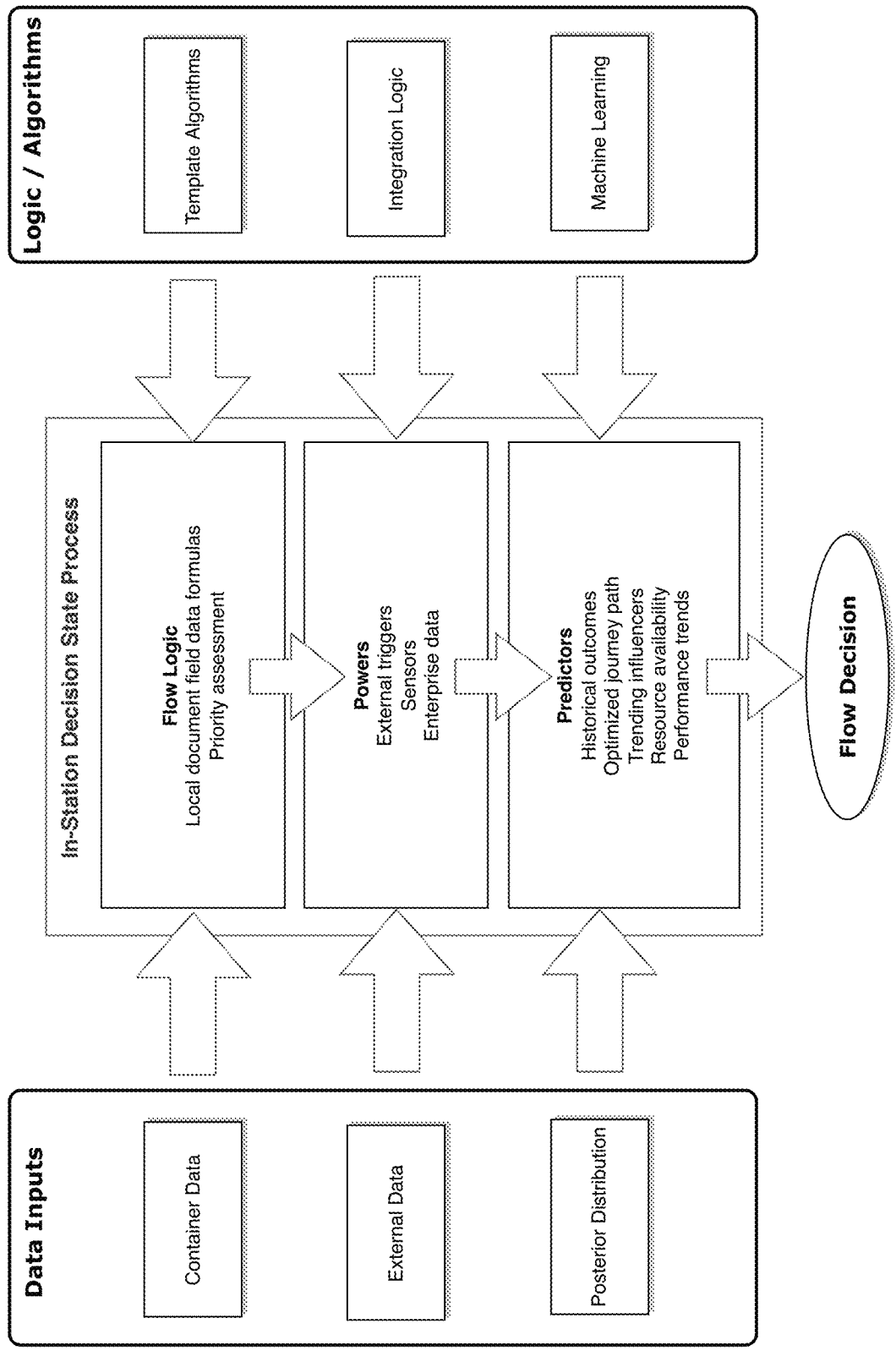
FIG. 19 is a diagram depicting sample application of predicators, including data flow leading to a flow decision.
Figure 20A:
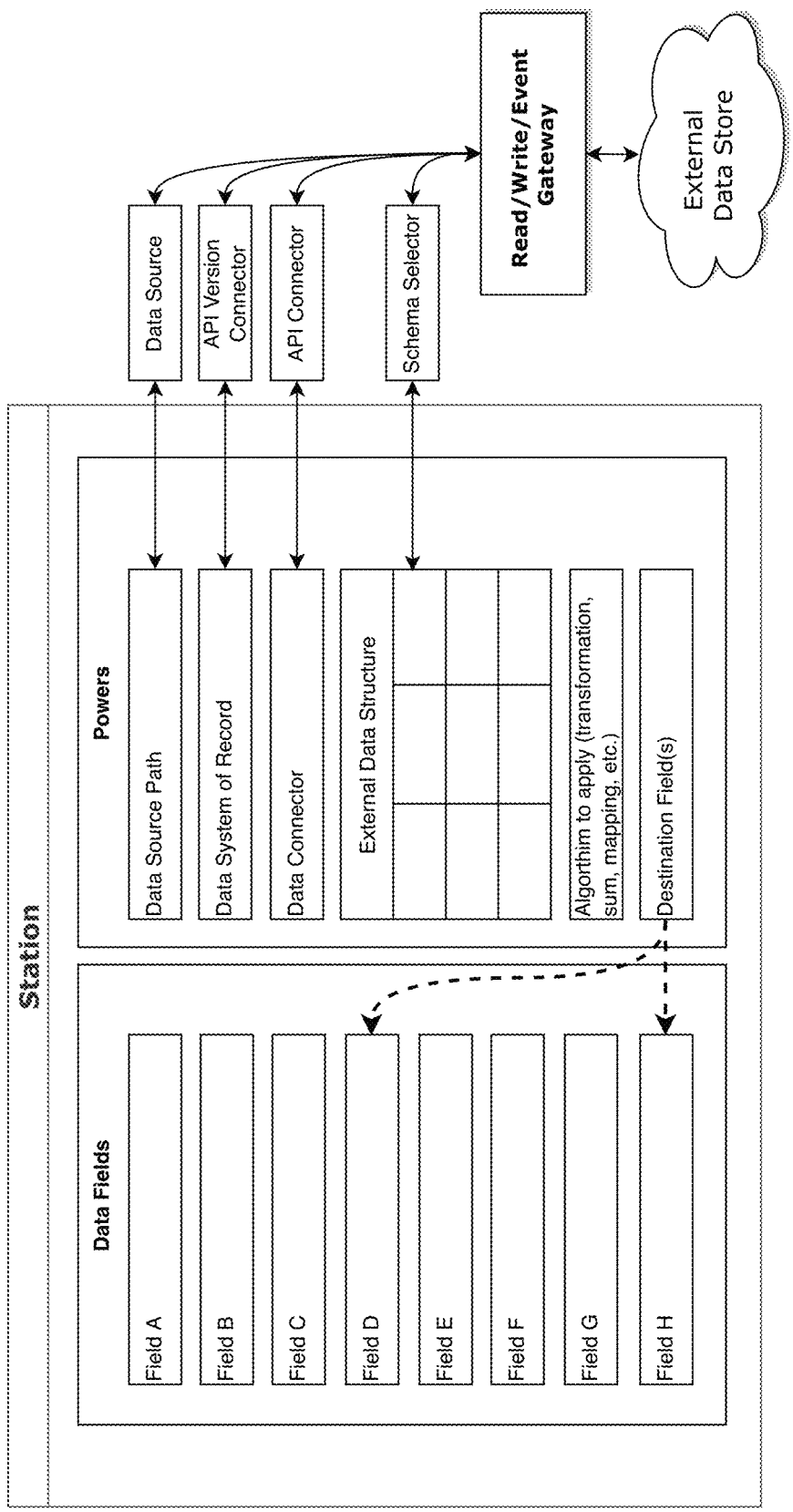
FIG. 20A depicts an example embodiment of an external data integration model via which a decision network connects to external data and process sources to drive internal decision-making through flow logic and data integration in the decision network at the appropriate station or node within the overall network ecosystem.
Figure 20B:
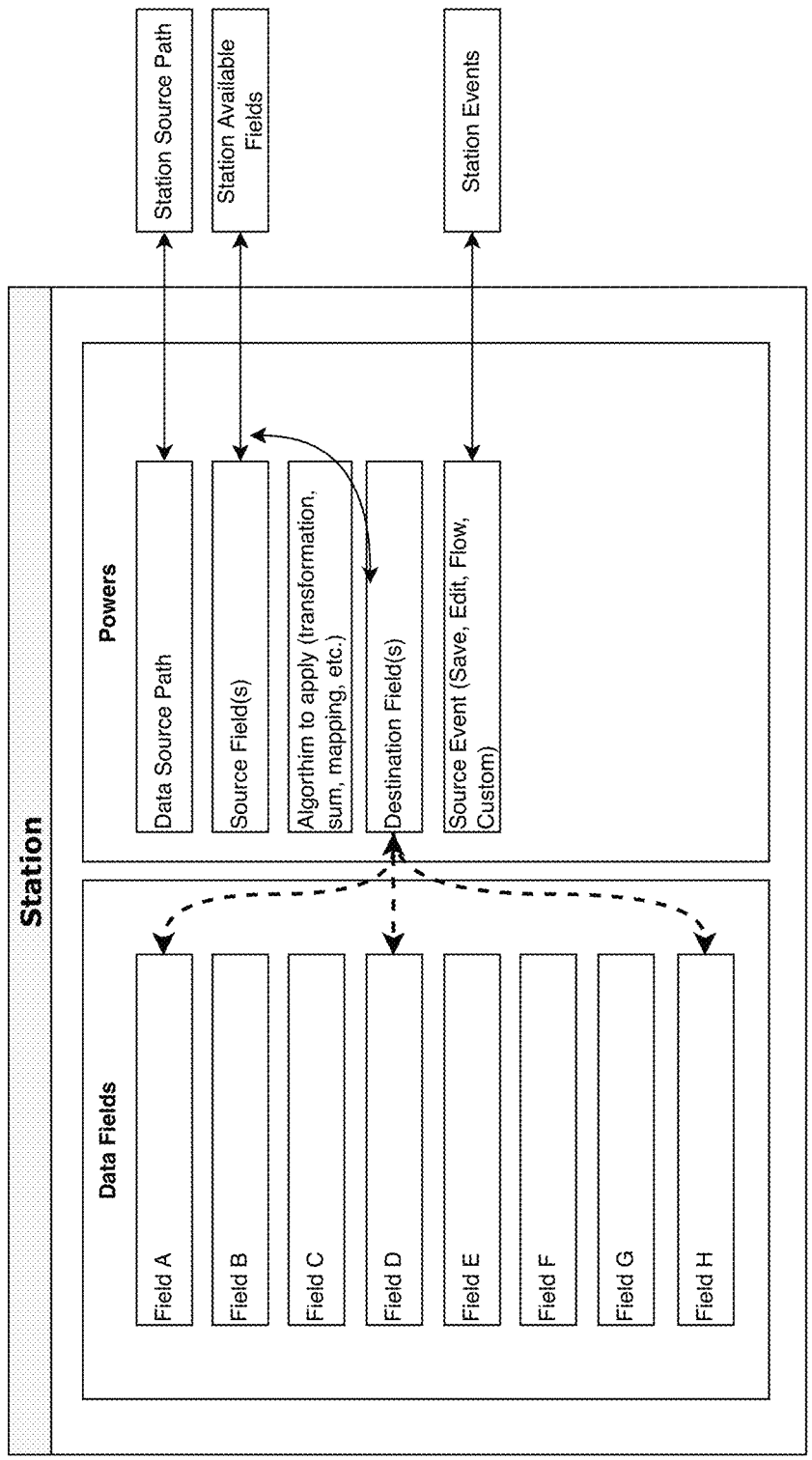
FIG. 20B depicts an example embodiment of an internal data integration model via which data and processes internal to the decision network can interact by providing computation data, data analytics, and/or optionally machine learning into the decision process.

Flow logic may incorporate fields from the current Container, non-Container data that is referenced and can be computed via Powers through integrations or external references (as illustrated in FIGS. 20A and 20B), and/or Predictive Logic which comes from a combination of historical data and outcome history, computed against current trends (as illustrated in FIGS. 18 and 19).

Predictive Logic

In the orchestration of predictive logic, the administrator or owner of the station will select data points from the Container journey that have been identified as causal for outcomes, and then apply the Bayes' law to the data and that will be applied to the other logic formulas so that trending outcomes and predictability can influence the best and desired outcomes of the decision flow.

Predictive logic is based upon having observable data points that are being aggregated and applied to the formula that indicates directional quantitative trends that matter (see, e.g., FIG. 18). Because of the flexibility in expressing algorithms for flow logic, the orchestrator can apply these predictive trending data points in any way that can be expressed in formula form.

Predictive logic in a decision network provides deterministic quantitative values in systems where uncertainty exists. An example is when two or more seemingly unrelated factors can influence an outcome when the certainty of one factor is trending in one direction in comparison with the volatility of another algorithm. The Bayesian approach uses the prior distribution to express the uncertainty present before analyzing new data and allows the remaining uncertainty to be expressed in the context of the newly observed data to create a posterior distribution. As more data is gathered, then the certainty of a desired result becomes greater as a process may augment this posterior distribution with the newly available data.

Example

An example scenario will now be described with respect to one embodiment. Suppose that a team manages about 1250 miles of gas pipeline, and provides weekly maintenance on 80% of that pipeline, and monthly maintenance on the remaining 20% of the pipeline. The cost associated with weekly maintenance is roughly $438 per mile per month, and the cost of monthly maintenance is roughly $345 per month. Downtime for weekly maintained pipeline is 0.037% while downtime for monthly maintained is 0.041%. Downtime results in outages that cost on average $23,575 per hour. Over time, pipeline begins to degrade and requires greater maintenance to maintain minimal outages, therefore, monthly maintained pipeline is typically newer pipe and components, whereas older pipe requires greater maintenance and therefore, is on a weekly schedule. New pipeline replaces results in both cost for swapping out older material and longer outages.

Suppose that a manager of the above team would like to determine at any one point in time, when the optimal time occurs on any segment of pipe to move from a monthly to a weekly maintenance regimen, and when the time is right to proactively replace the pipeline altogether.

Since the team manager above is tracking current costs, trending downtime, cost for downtime, frequency of complete failures in a pipeline segment, he would like to optimize maintenance and replacement based upon the predictability associated with maximizing profits for the managed 1,250 miles of pipeline. The manager may recognize that uncertainty exists because gas quality can vary from day to day and month to month, which adds a statistical standard of deviation to the speed that pipeline components degrade.

Based on the above, a system may generate several posterior distributions when looking across each segment historically, and then measuring current values for those same segments based upon real time sensor data for flow velocity, volume of impurities detected, etc. This distribution can then predict the likelihood of outages and failures based upon the given team's current maintenance approach and modeled against hypothetical approaches that the team has not selected for a particular segment but is following with an alternative segment.

In this predictive example, the hypothetical team can use their decision network nodes to process and generate the "observable" data that will go into creating a predictive distribution (posterior) for each scenario and then model daily decisions for each individual segment of the line in the examples using systems described herein. In this way, the outcomes can be tuned for greater profitability based upon real-time and historical data across a learning algorithm.

Powers

Some data that drives decision comes from external sources to the flow of the decision process. These data points may come as computed formulas, numerical or even qualitative figures, or generated by IoT sensors that provide real-time data input that drives better outcomes. Powers can reference and compute data that comes from other locations within the DN as well, meaning that a source of historical data, or even the outcome from a separate decision network algorithm might provide values that when combined with the other forms of logic, can influence decisions to flow in a variety of different ways.

User Experience Orchestration

Figure 9A:
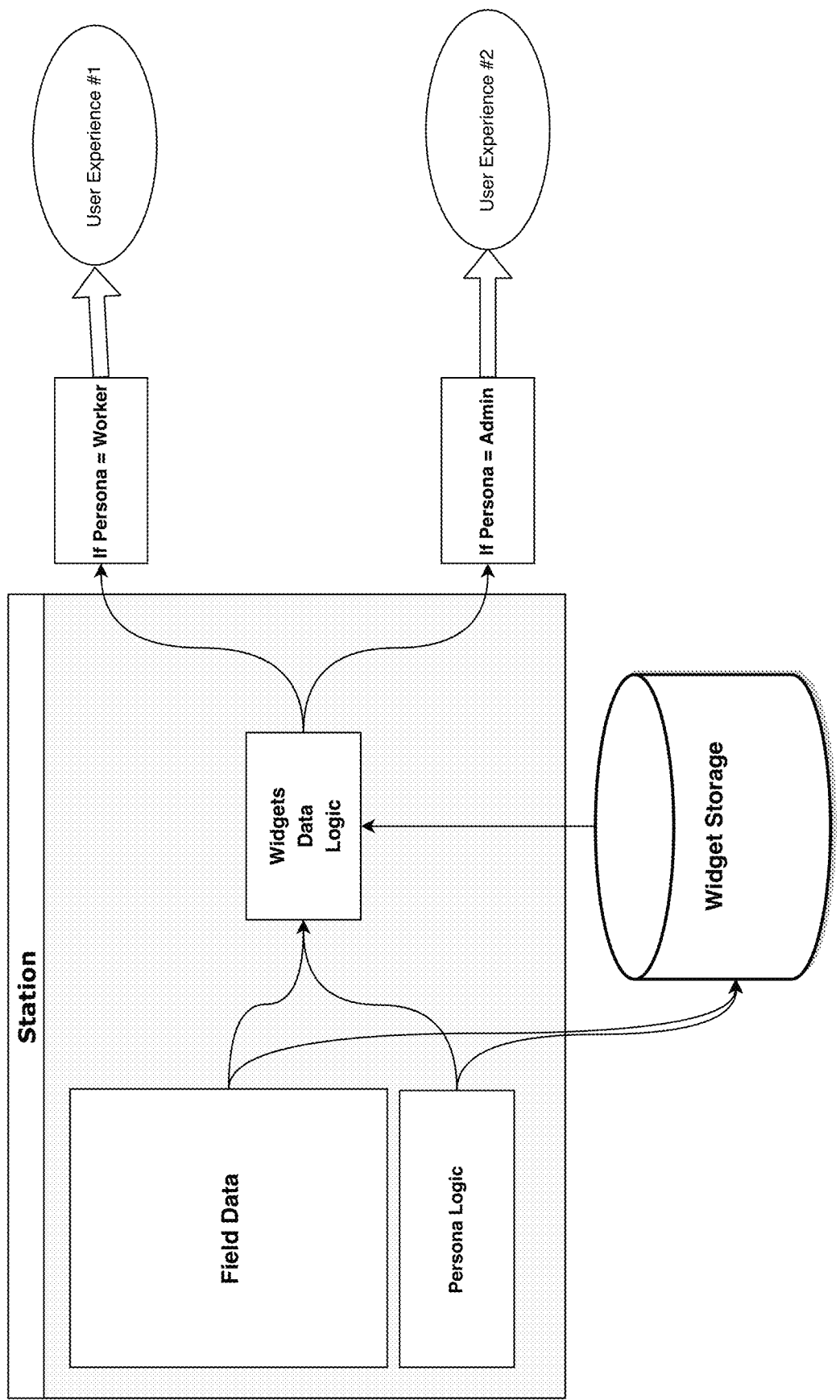
FIGS. 9A and 9B illustrate example station experience orchestration, where different personas are presented with different user experiences with respect to user interfaces presented in association with a decision network.
Figure 9B:
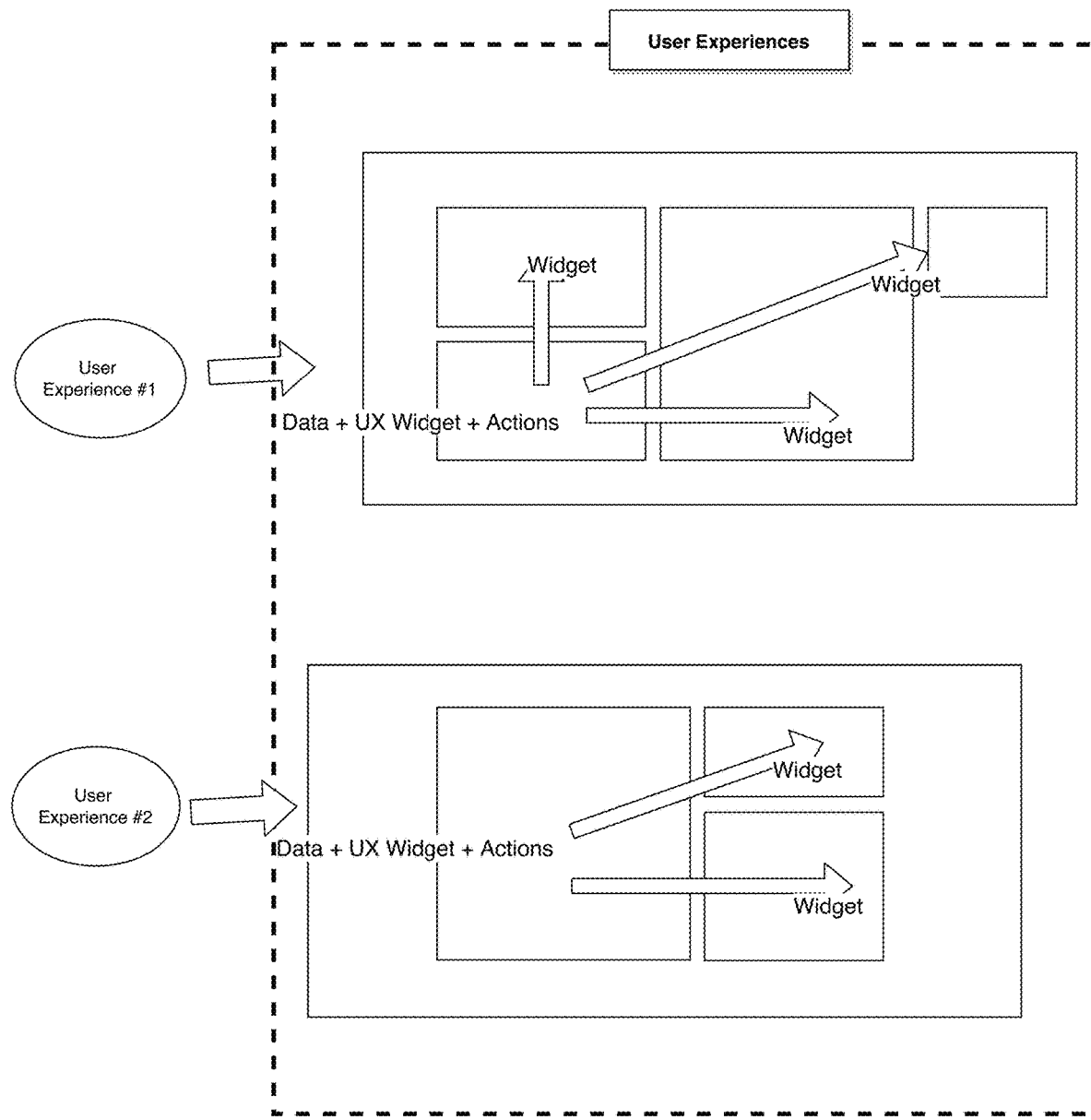

The ability to bind unique user experiences to a station in the Decision Network means that not only is access to the information and tasks tailored for the persona and duties at hand, but it commonly can lead to better and more intuitive decisions being made. In the Station UX orchestration, the builder of the station logic can also choose in what way those assigned to do tasks can interact with the process there, such as shown in FIGS. 9A and 9B.

Binding user experience to each persona and node within the decision network means choosing the right interface component or widget to perform and gain visibility into each task, data element, and rule. Not only is data, logic, and connectivity essential for the network to do its job, but those that interact with the network need to do it through an experience uniquely suited for each task, data gathering, and step in the decision journey.

Orchestration can provide a visual library of experiences, that allow the configuration administrator to map data fields, metrics, and any reporting or decision data into visual tools for manipulation or data gathering that drive the success.

Container Journeys

The decision network utility provides a framework for applying process, data, and logic rules to answer a consistent flow of decision. The structure of the network supports a container for individual instances of conditions requiring a decision. The structure provides the pathways and consistent rules, whereas the Container (which could also be considered a document, in some embodiments) contains the instances of the criteria used to enact decisions. It is the Container that flows (such as by reference) through the network on its journey to a predetermined outcome.

Figure 10A:
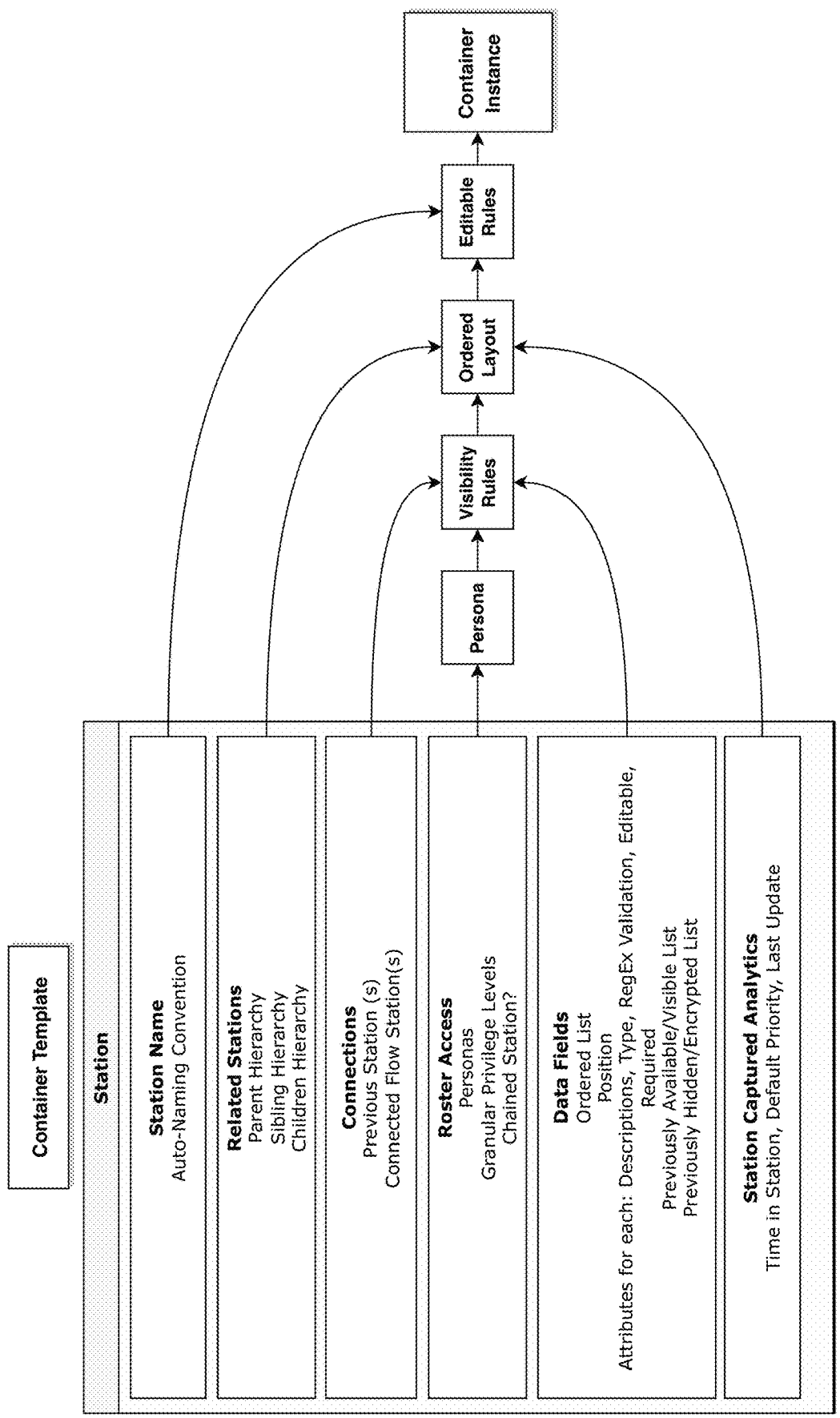
FIGS. 10A and 10B illustrates how data within a container may be mapped and captured from a container template to a container instance, applying rules established within the template that governs the container when the container resides in a particular station node of the network.
Figure 10B:
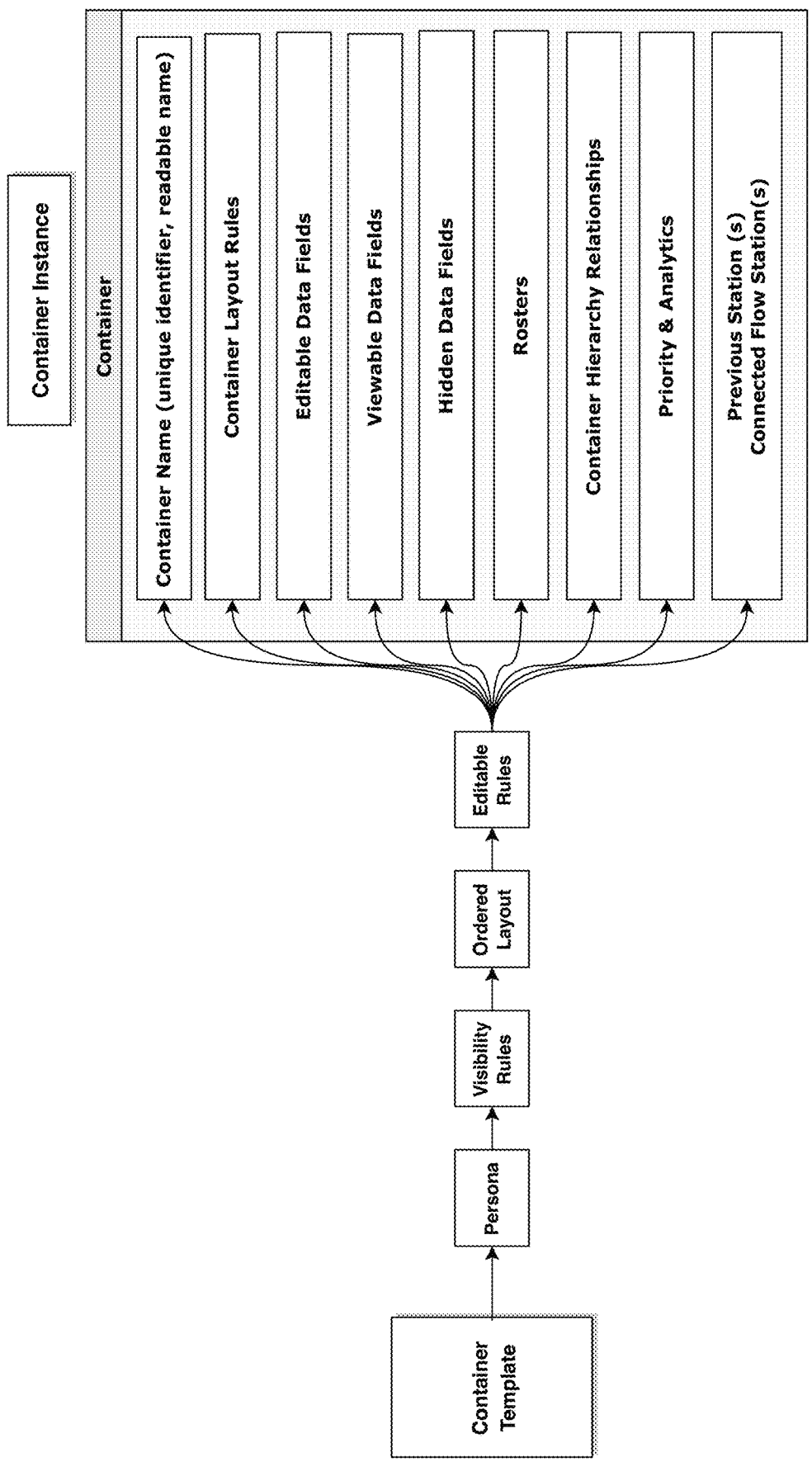

FIGS. 10A and 10B show the connection between the station template that defines the structure of the Container, and the Container itself, in one example embodiment. The template supports rules for how the Container is seen and interacted with by authorized users. In this case, a new Container that physically has a state associated with a station, will exhibit capabilities associated with those rules. A previous station may have allowed a user to see and capture pre-defined fields, but the current station can change who, when, how, and what the assigned user of that Container will interact with it, such as based upon criteria that includes, in some embodiments, one or more of: the users' role; the visibility and access rules; the way the data fields and interactions are presented (such as order, visible or hidden, editable or read-only, or required or optional); and/or the timing of the Container being ready to be applied to a flow condition (e.g., synchronous, asynchronous, automated, human triggered, rule triggered, etc.).

In this way, Containers flow from station to station following rules that were orchestrated by an administrator, and worked on by people, systems, and/or devices that inject data into the Container as a vehicle carrying out a decision process.

Container Location

Figure 11:
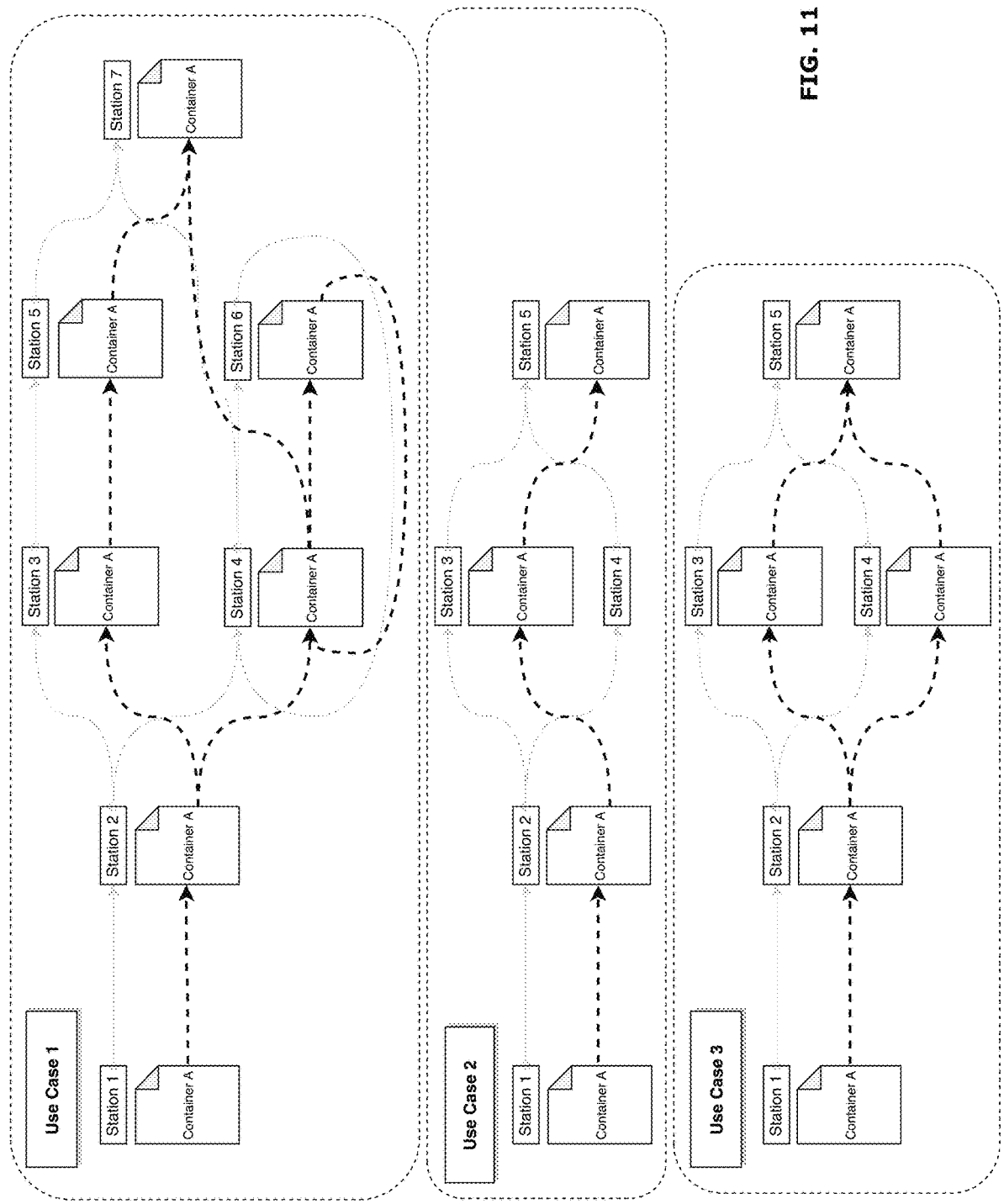
FIG. 11 is a diagram illustrating where (at which station) a container may virtually reside at different points in time in three different non-limiting sample use cases, where a container may simultaneously reside at one or multiple stations at a given time.
Figure 12:
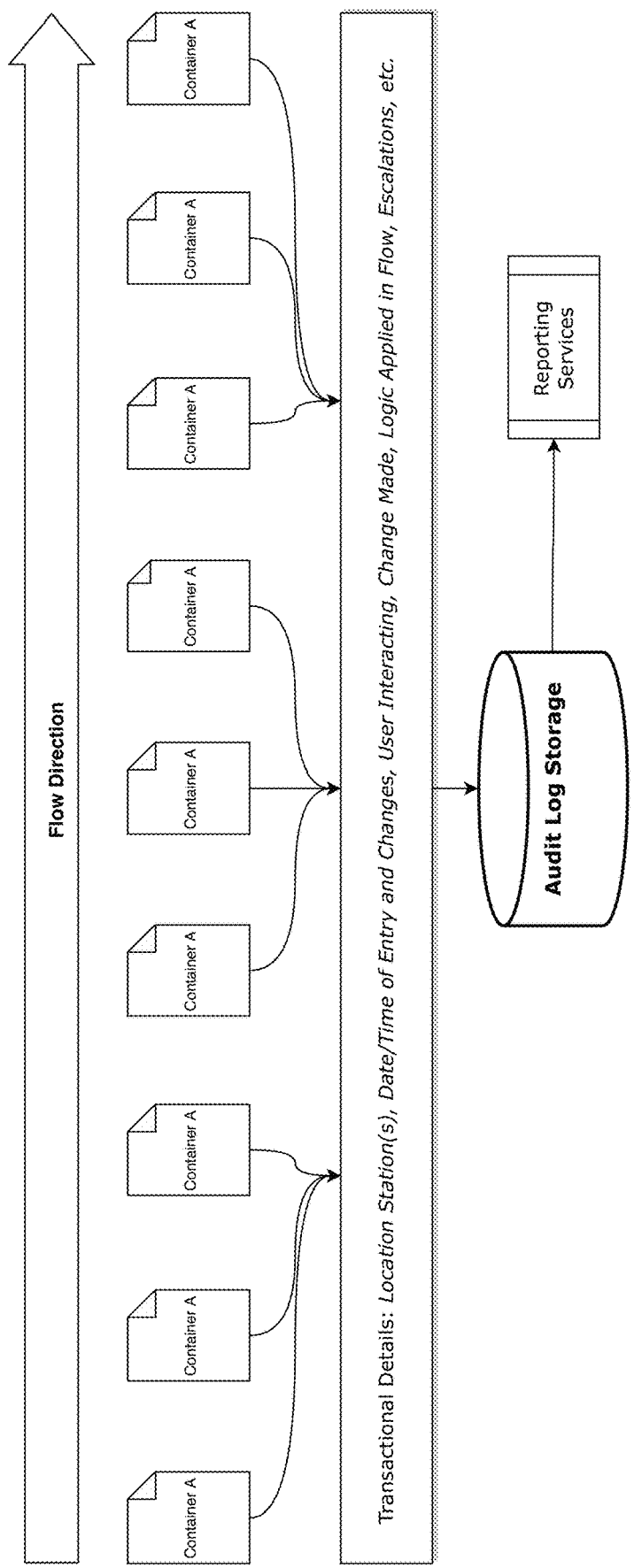
FIG. 12 illustrates an example visual depiction of data collection for storing a container audit trail, showing transactions related to a container through its journey within a decision network, which may be used for purposes of analytics, predictive logic, security oversight, performance, an/or accuracy reporting.
Figure 13:
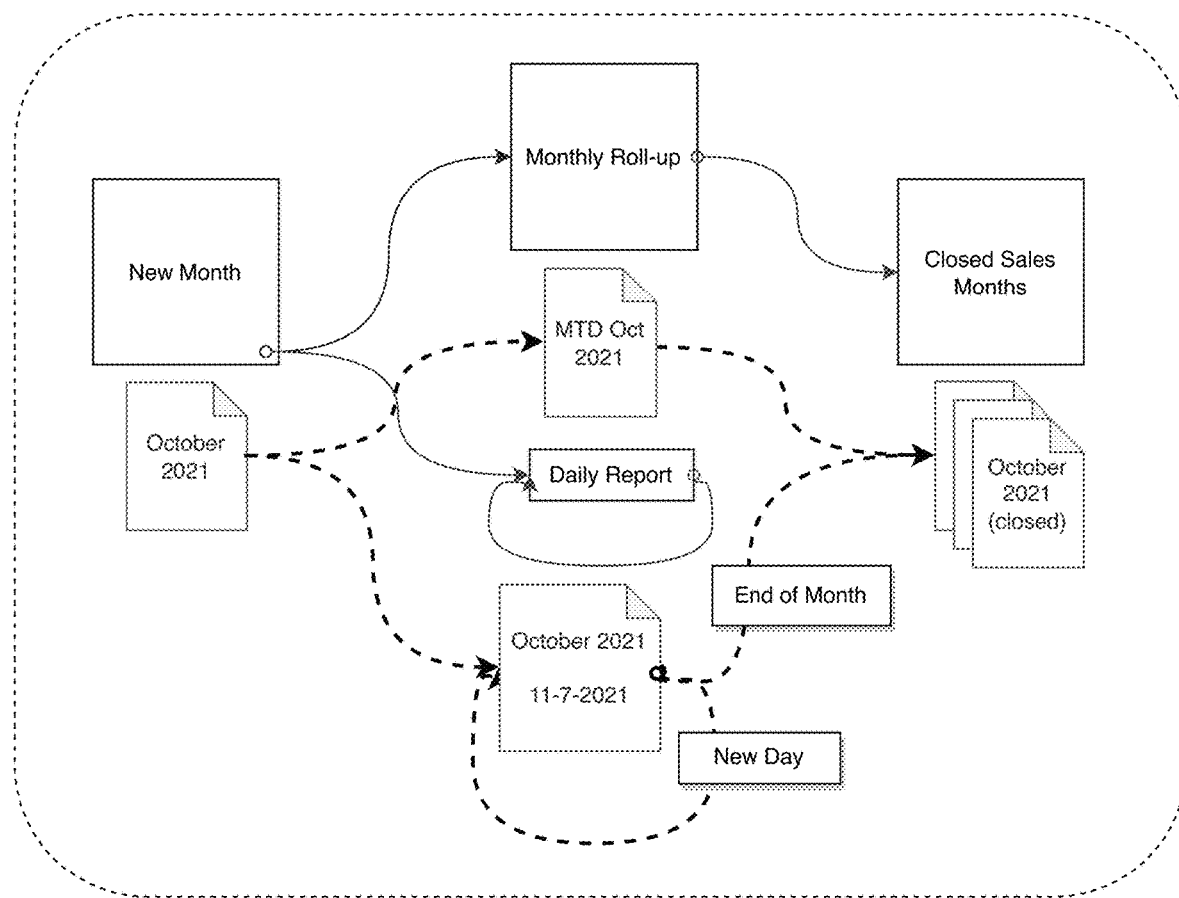
FIG. 13 provides a visual depiction of multi-location container data flow with multiple stations interacting to aggregate and separate tasks for the same container, in one example sales use case.

Containers possess the attribute of location. This is a virtual attribute that shows which station (or stations) are associated with the current state for the Container. Within each attended station exists a queue of Containers. While in the data model the Container may only exist physically in storage in a single location (e.g., in a database or a certain file location), the state of decision within the network allows the Container to virtually reside in one or many different stations. For example, as shown in FIG. 11, across three different use cases, a given container (Container A) may be virtually or logically "located" at different stations at different points in time, but this movement may be made by reference or pointer to a single centralized source of truth for the current contents of Container A at any given point in time. In some embodiments, containers may wait (asynchronous progress) for other station versions to be completed before they once again become united in one virtual location.

The first use case of FIG. 11 provides an example that demonstrates a container journey where the particular container represents the creation of a monthly sales report. Once created, a new container flows into two different station—the first is where it sits aggregating values based upon hourly, daily, weekly trends in sales. The second parallel station is where all daily values are tabulated and stored in a daily field for the sales closing that day. At the close of the day, that same container will return into the beginning of that same station as a new day begins.

The first station will be updating the running monthly totals and averages. The same container is gathering the relevant data at each station, but each is being subjected to different decisions, user visibility, and tasks (such as approvals and generating alerts to the appropriate team members in finance, operations, and even sales management).

Once the final day of the month comes to an end, the daily station routine will complete for that container and join back with the monthly station as that month is complete, and the container may flow into a station of historic months, and then undergo another set of approvals and reporting processes, for example.

Container Auditing

In some embodiments, the dependency of predictability and detailed analytics behind the decision process is improved by enforcing that each transaction impacting the flow and interaction of Containers be permanently tracked in such a way that a complete audit trail is generated over time for each container. This process (such as shown in FIG. 11) may automatically store data for each access, change, flow logic step, etc. over time. That utility allows the ability to look at data in motion through the decision process at any past point in time. These container journey paths may then provide detailed models that drive algorithmic analysis of predictability and drive down the levels of uncertainty when decisions are being formed in the Decision Network. Rather than looking at aggregated data as is typically available in business intelligence settings, the DN allows for individual cases to be analyzed not from their completion, but from any point along the journey. This analysis capability drives more accurate statistical relevancy that just outcome-based computations.

There are other highly beneficial and intended side effects of this kind of audit trail. For example, decisions can be changed after the fact because the system can roll back all the impacted decisions and processes that led to a lesser decision in the previous container flow pathway, in some embodiments.

Implementing Logic

Container Flow Rules

A Container template at the station level, such as shown in FIG. 14, provides a broad set of meta-data and tools enabling granular logic that drives the micro-decisions that ultimately lead to intelligent decisions and desired outcomes. The process of bringing together the required elements that may become the building blocks of logic in a given instance may first involve a security screening to ensure only the right authorized users can create and modify decision logic.

The next logical step, though not required in a precise order, is the integration of external data (the functionality associated with data integration in given instances may also be referred to herein as Powers). This data may come from any internal source (e.g., data tables, usage metrics, trending analytical data, etc.) or from integrated external data sources (e.g., enterprise software, internet data repositories, connected IoT devices, etc.). By integrating or mapping data from these sources (such as shown in FIGS. 20A and 20B) into local fields, additional criteria can front load any decisions with timely and pertinent information not currently compiled directly within the decision network. In this way, external data becomes an extension of the DN and can be the catalyst for driving time sensitive and robust decision within the station flow logic structure.

Predictive or Bayesian algorithmic logic is a next step in the station-implemented processes described herein. The data-driven predictive part of decision making allows the DN architect to apply historic outcome-based data to drive ever improving decisions. Two important steps are for the network to provide observability of any data point (internal or external) along with observable insight into the process steps themselves to compute a posterior distribution and then refine that distribution with new data points which allow the DN to learn from the past with the influence of new information that will in turn lead to higher predictability through greater certainty of outcome. Since any source of data can be brought into this environment of observability (such as shown in FIG. 19), there is no limitation to choosing the most measurable and impactful variables that correlate to outcomes. This might include sensor data, historical business intelligence, machine learning algorithms, or humanly observable data, among others. The DN adapts and makes all this data available to drive elements of each direction flow or decision flow within the network, and in turn, stores that data allowing for an ever-perfected Posterior Distribution to be created as the network cranks out decision after decision.

Figure 17:
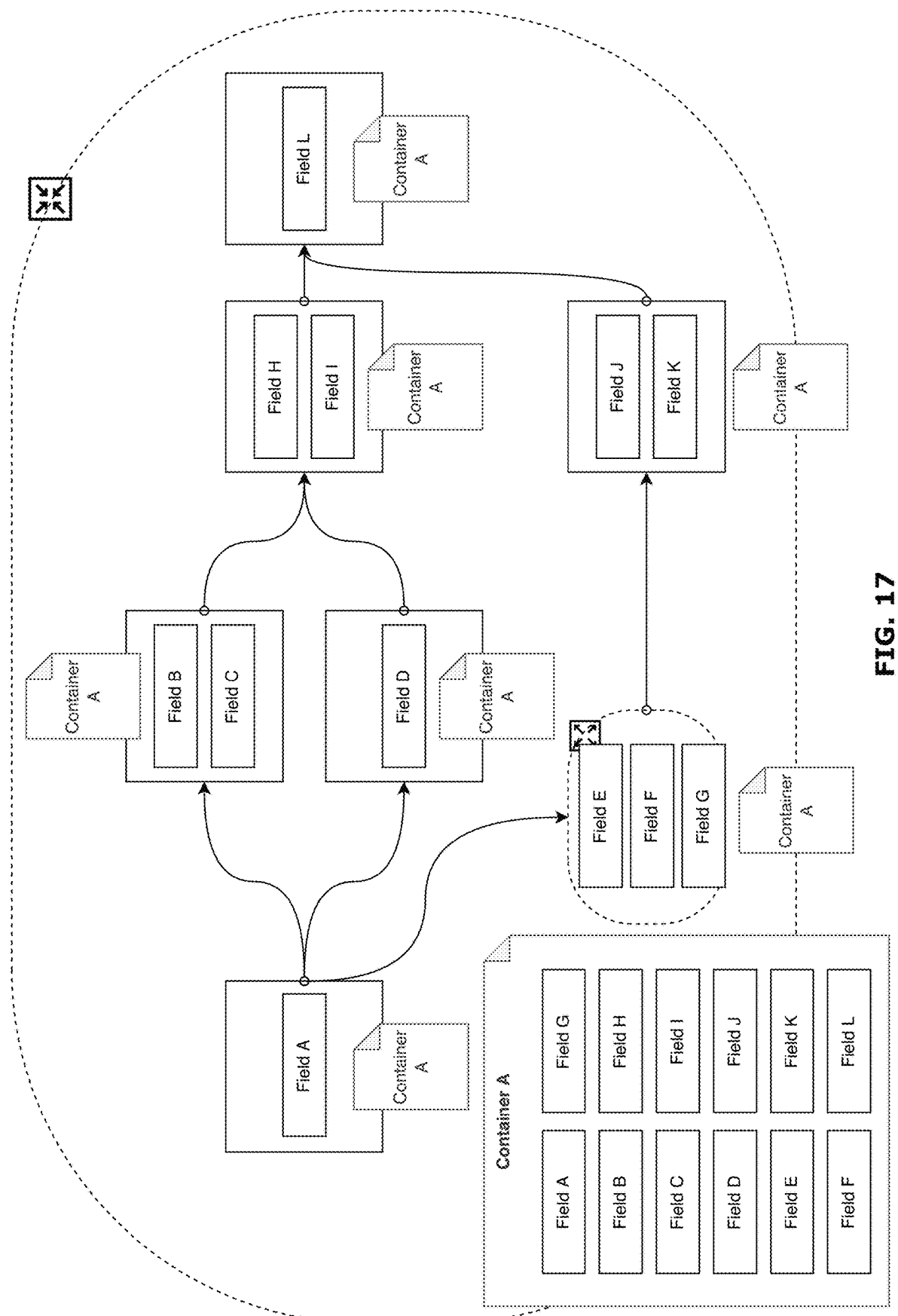
FIG. 17 illustrates a sample data flow in which a container can be separated and then merged as it flows through a decision network on its way towards an ultimate decision or outcome, in view of a container's ability to exist in different stations or states at any point in time.

The final step of the Logic orchestration is the decision that cause the flow of a Container instance to the next appropriately chosen station, which could be one or more stations, including the same station that currently houses the Container. As in the illustration, this can consist of rules based upon any one or more of the following criteria: quantitative data, qualitative comparison of data, and formula driven computational data. The decision may include one or more targets and be mutually exclusive or all-inclusive of the connected pathways in the network (see FIG. 17 showing a container merging example).

Container Generation

As the fundamental carrier of data in the decision network, container instances may start at predetermined locations (Stations or nodes) within the network that may be referred to herein as Container Generation Stations. Containers can be generated either manually by a team member of the DN with sufficient privileges, or automatically triggered by events occurring from other decisions (see, e.g., Station 1 of FIG. 15). In the first instance, a Container may be generated according to the station template in the Container generation station and be named and given the attributes of that Container instance (time, priority, owner, unique identifier, any default meta data, etc.) that will allow this new Container to travel down its journey from creation to desired outcome.

Figure 15:
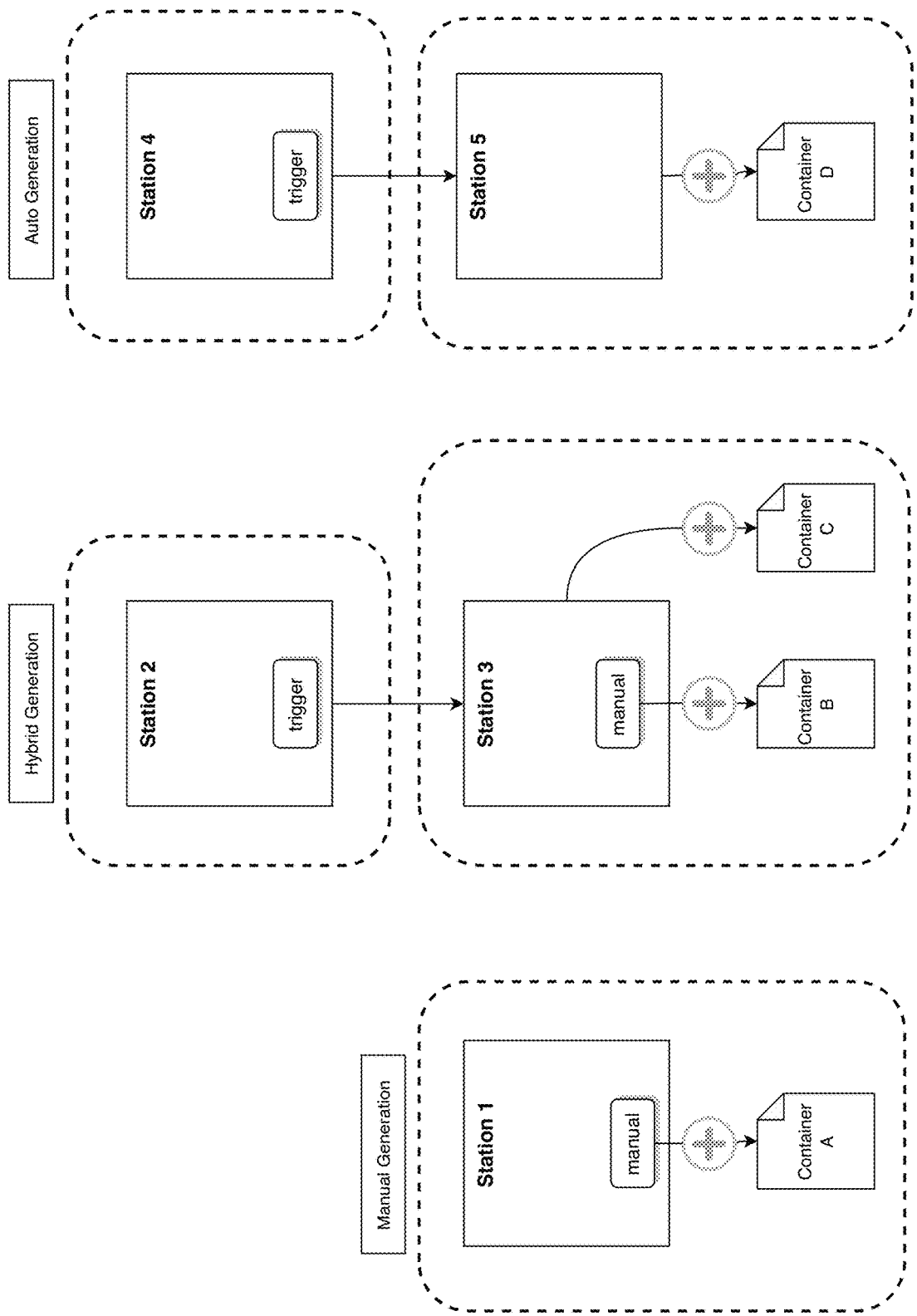
FIG. 15 illustrates sample manners in which new containers may be created within a decision network ecosystem: as a manual event, as a triggered event, or as a hybrid of manual and triggered events.

Another model for container generation is through automatic or triggered generation (see, e.g., Station 4 of FIG. 15). Rule-based generation of new Containers is initiated in a station where prescribed rules are met and are connected to the automated generation station. In this case, meta data from the triggering station can be passed so that the new Container instance carries the contents of the initiating decision into its journey along with any other data in the same way the manually generated Container begins its life. Triggered Containers carry all the same attributes of a Container from the Container generation station template that defines its initial structure.

The last model for Container generation is the hybrid Container generation where Containers may be either manually or automatically generated based upon the rules created by the Station Group Administrator or architect. When orchestrating a hybrid collection of stations, there can be reasons why new Containers can either being automatically based upon conditional rules or may start manually when a user with the proper authority is able to add new Containers on-demand. In these cases, the same criteria and meta data rules may apply as if the Container generation station was one or the other types (see, e.g., Station 2 of FIG. 15). The new Container may bear the flag of being auto generated or manually generated by indication of the creator as either a user (user ID) or a triggering station (station ID), in some embodiments.

Container Escalation

Figure 16:
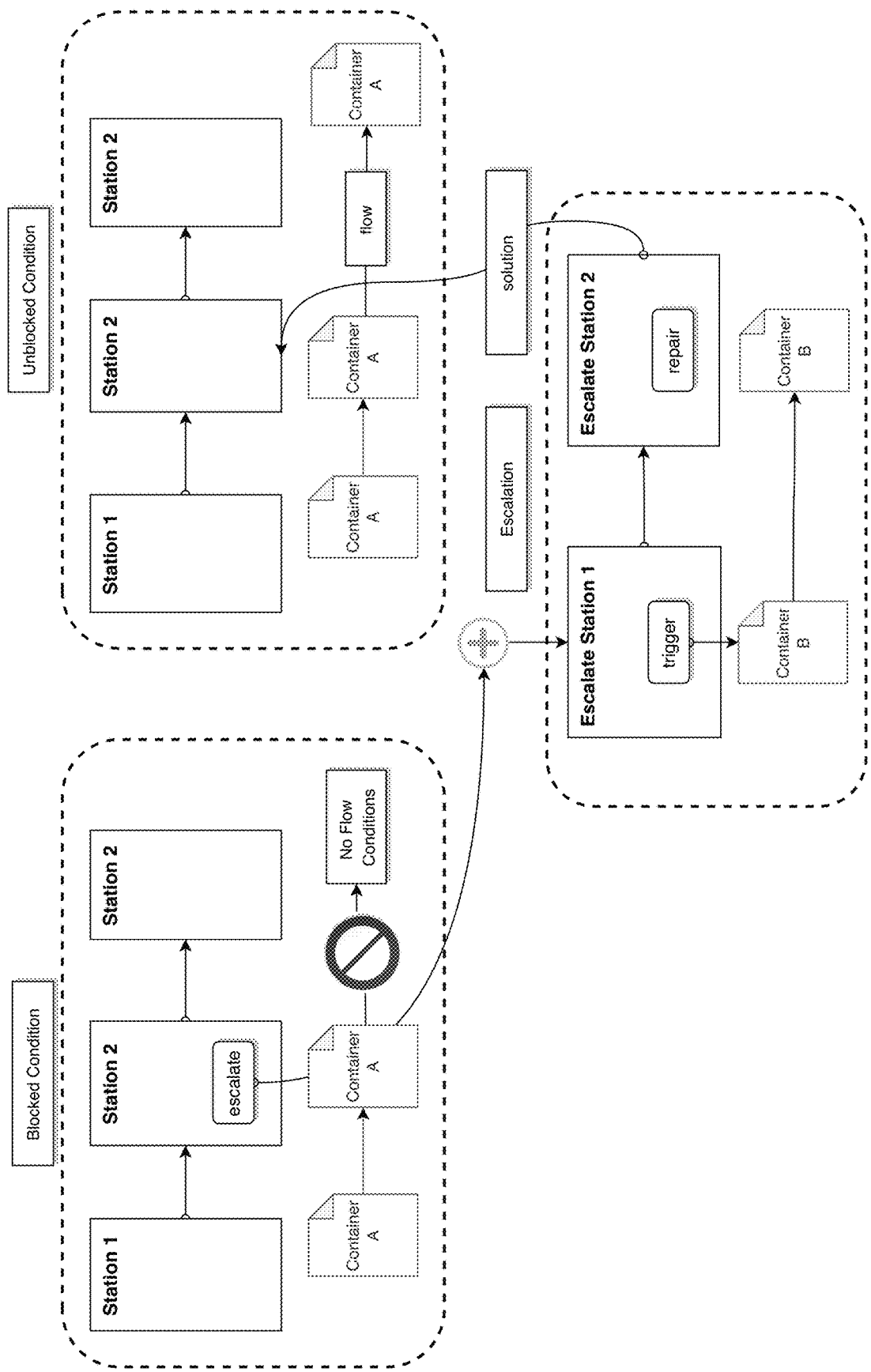
FIG. 16 visually illustrates a sample container escalation whereby breakages and blockages of logic can be administered with respect to personas within a decision network to overcome unanticipated conditions, such as non-deterministic logic situations or data variability.

In any decision network there exists the likelihood that a Container state may become ambiguous or in an error state where the flow logic rules, or external conditions might block the anticipated flow of the Container (see, e.g., FIG. 16). In these instances, a DN needs a utility for addressing such blockages or deadlocked conditions. Otherwise, it is possible to have a broken journey or pathway through the DN that inhibits the ability to revise and update the process. In the DN this process of mitigation is referred to as Container Escalation. The reason for escalation is that the blocked Container flow must be addressed by an external rule or even individual with the security oversight to change rules, data condition, or even modify the logic of the station that it blocked. Not only is this a work around for unanticipated conditional rules, but it is a utility that drives greater factors an improved outcome from the DN as it matures and effectively learns from live cases.

Container escalation takes advantage of all the primitive capabilities of any other DN. This means that a Container that moves into a blocked status, whether detected by a human that notices as state prohibiting flow, or a rules-based detection that is aware that a Container has remained unable to flow according to existing rules even through sufficient flow criteria has been met. The first this that happens is a trigger for a escalated Container to be created in a Station Group identified for the handling of these blocked states. The newly created Container, either manually or automatically created, is connected to the source Container via meta data indicating that its job is to unblock the state of the generating Container.

The logic and rules that drive the escalation flow can be orchestrated in any way a traditional group of stations can work. This means that individuals may intervene as workers in the blockage state manually or that rules may be created to alter the state of the blocked Container that result in the Container state being changed from blocked to unblocked in the station that initiated the escalation. Activities might include the creation of new flow rules to address the blockage, changes in the field data in the blocked Container, or additional conditions or processes that address the causality of the blockage. The result will be a auditable trail of escalation, causes, and remedies from which the DN can be refined to achieve better throughput and fewer functional delays and outages.

Container Merging

The process of managing how Containers flow through their unique decision-driven pathway in the DN is illustrated in FIG. 17. The illustration shows a simplistic range of ways that a single Container may synchronously and asynchronously flow across a group of stations. Container merging is a change to the state of a Container from being virtually located in more than one station to being centralized at a single station. The bringing together of these different versions occurs according to flow logic rules and can be because of automated or manual steps from each merging station. Data aggregated from disparate stations into one allows authorized users access to data and state information not available until the merge occurs.

Decision Networks can inject decision data at any step in the Container's journey through a variety of stations and resultant decisions. This data set becomes available for down path decisions after becoming joined in a merging station. This process allows for the DN to allow not only logical decisions to occur against data elements, but also in concert with events like triggers and the existence or absence of criteria required to bring the data sets together in a single station. This could describe approval processes from different contributors that are asynchronously interacting with Container decisions or closing the books on a period composed of a variety of separate events.

Predictive Decisions

Previously discussed above is the concept of predictive decision making with the DN based upon Bayes' Law of Posterior Distribution. Based on Bayes' Law, probability distributions can be generated from observable scientific data. By representing historical observables combined with new or more recent observables, a more accurate likelihood can be achieved proportional to the number of events tracked. Bayes' Law may be written as:

$$p(\theta|y) = \frac{p(\theta)p(y|\theta)}{\int_\Theta p(\theta)p(y|\theta)d\theta}.$$

The Bayes' Law formula generally describes the probability of an event, based on prior knowledge of conditions that might be related to the event. The DN allows orchestrators of the network logic and structure to identify observable data points (calculated algorithmically or multiple individual data points across a certain type of activity). Those data points combined with event-based analytics of the system can become powerful predictors of outcomes that help overcome the uncertainty of certain events or outcomes occurring.

The illustration in FIG. 18 shows the application of gathering observable data points across the DN and then storing observable metrics generated by the processes that drive the decisions within the network. Because the DN can expose any individual piece of data, or computed trends such as averages or statistical values like standard deviations, along with the events that drive the decisions, the predictive data can adapt decisions to more completely achieve an outcome that includes greater certainty of success.

Ultimately, at an individual station where flow logic brings all criteria together to provide the most informed decisions, whether that includes deterministic data like formulas or qualitative assessments, or combines external triggers and source data, the inclusion of predictive analytics utilizing the posterior distribution will further guide the outcome to meet expectations over the course of time and frequency of logical decision making across the network. FIG. 19 shows how all these various criteria may come together to drive the desired decision that maps to the best predicted outcome given the data available, in one embodiment. It will be appreciated that while a single station may generate an ultimate decision of the network, that decision may be driven in part by container data that was generated by a number of other stations individually or collectively, and such container data contributed by other stations may include or reflect one or more decisions determined by one or more of those other stations in the decision network.

Data Integration

Data integration is a powerful utility in the Decision Network described herein because it provides timely data gathering processes that lead to informed outcomes. Bringing data into the DN may be accomplished, in some embodiments, via the Powers interface. This integration interface may allow an orchestrator to define the source of the data and determine read and write capability for the data that is connected to the DN through a trusted source. Data may come from internal DN storage or from storage or services external to the decision network (such as from an external network such as the Internet). Sources may include, but are not limited to, application data via APIs and RESTful services, but many other forms of synchronization or data transfer may also be supported.

External Data Integration

FIG. 20A illustrates an example data flow that enables connection to external trusted sources via a programming gateway, and then maps data from the source into a given station of the DN with the intent of using that source data, either in real-time or synchronous mode, or asynchronously to drive elements of a logic decision. When the data is available, it can be stored, manipulated via one or more algorithms, or utilized in any transformative way to achieve a criterion for a decision, in some embodiments. The external connections may be bi-directional so that anything imported can also be exported via the same gateway. The ability to both read and write via external connections allows the DN to store essential data for later use in other decisions or verification of other events that can trigger additional decisions to be made.

Internal Data Integration

The Decision Network may also be a source of data that can be utilized for decisions, even when that data comes from an internal network source not immediately aligned with the current station template. FIG. 20B provides an example manner in which data may be mapped from other containers within the DN. In the case of internal data integration, some search criteria or filtering may be performed by a station to get the right field from the correct or relevant container. In some cases, the data retrieved may be a compilation of a field from more than one container. For example, the internal data might include the average time a container with greater than a value of 7 for field A may have remained in a particular station. This variable amount in such an example may only be relevant in real-time within the flow logic of the station and the container attempting to meet a criteria and then successfully flow to the appropriate next station according to the rules.

Process Triggers

Figure 21:
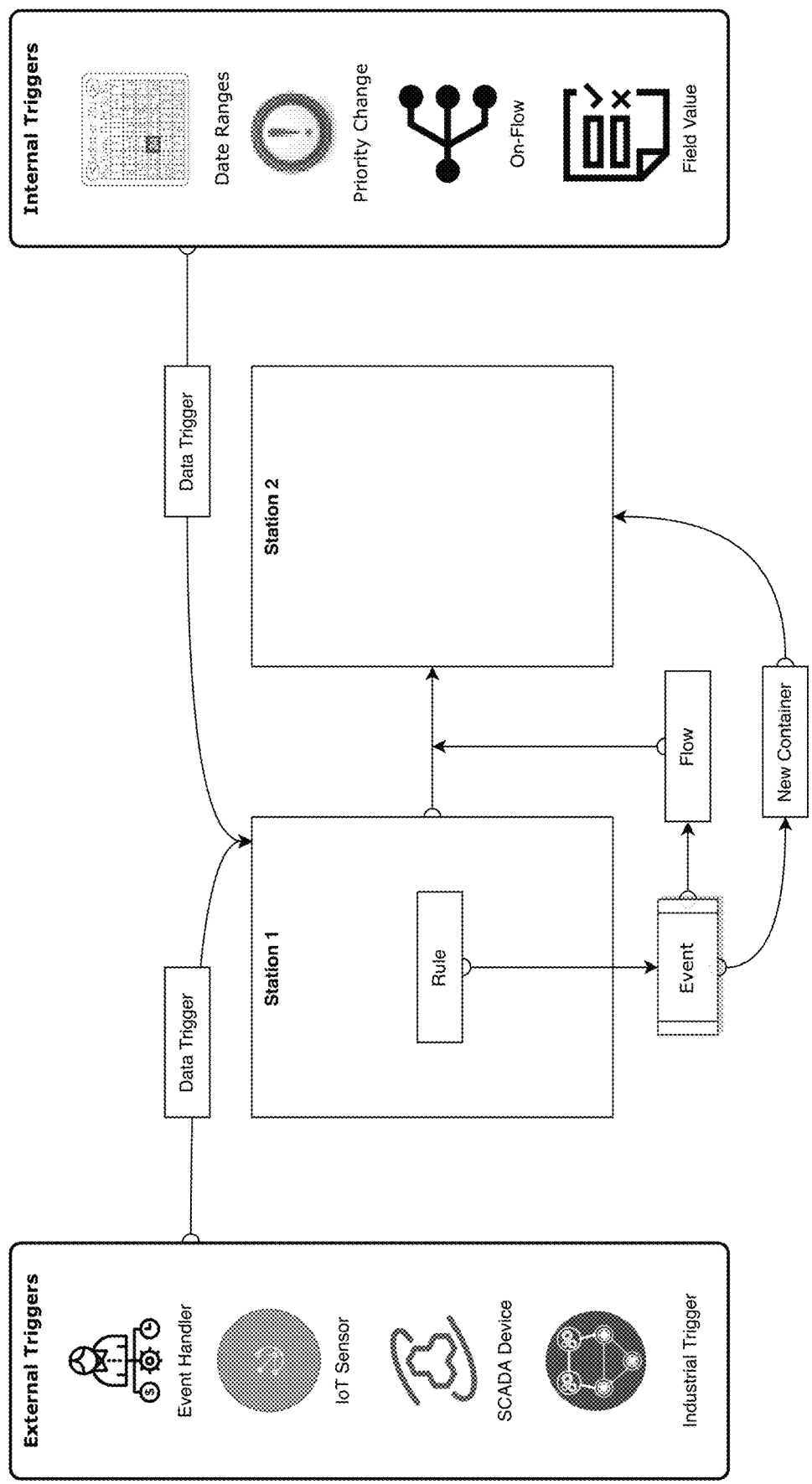
FIG. 21 illustrates example data flow with respect to data process triggers, showing how external and internal triggers can feed data and process events into a flow logic process based upon conditions that are linked to containers within stations based upon subscriber rules that actively listen for specific events to occur, according to some embodiments.

Process triggers, in some embodiments, may be event-based alerts or timed criteria that can come from an external or internal source and be used to initiate an automated flow logic event. For example, a station may be waiting for an external IoT sensor to indicate a threshold has been exceeded to trigger all containers in the station to flow to the next logically adjacent station. In this case, it is not a field or calculated value that provides the trigger, but an event that sends across the existence, causing container flow to occur. FIG. 21 provides an example of data flow with respect to process triggers, in one embodiment.

For internal events, watchers can wait for certain mapped criteria to be met. For example, if a particular container volume threshold is exceeded in a particular station, it could trigger a container generation event in another station, or even cause a container waiting in another station to flow, which could trigger an email to be delivered to a set of individuals in one example. Thus, a DN is capable of not only making decisions, but also driving actions based upon those decisions. The cascading effect of one decision driving any number of child or dependent decisions may be considered to constitute an adaptive and responsive network.

Data Integration

Figure 22:
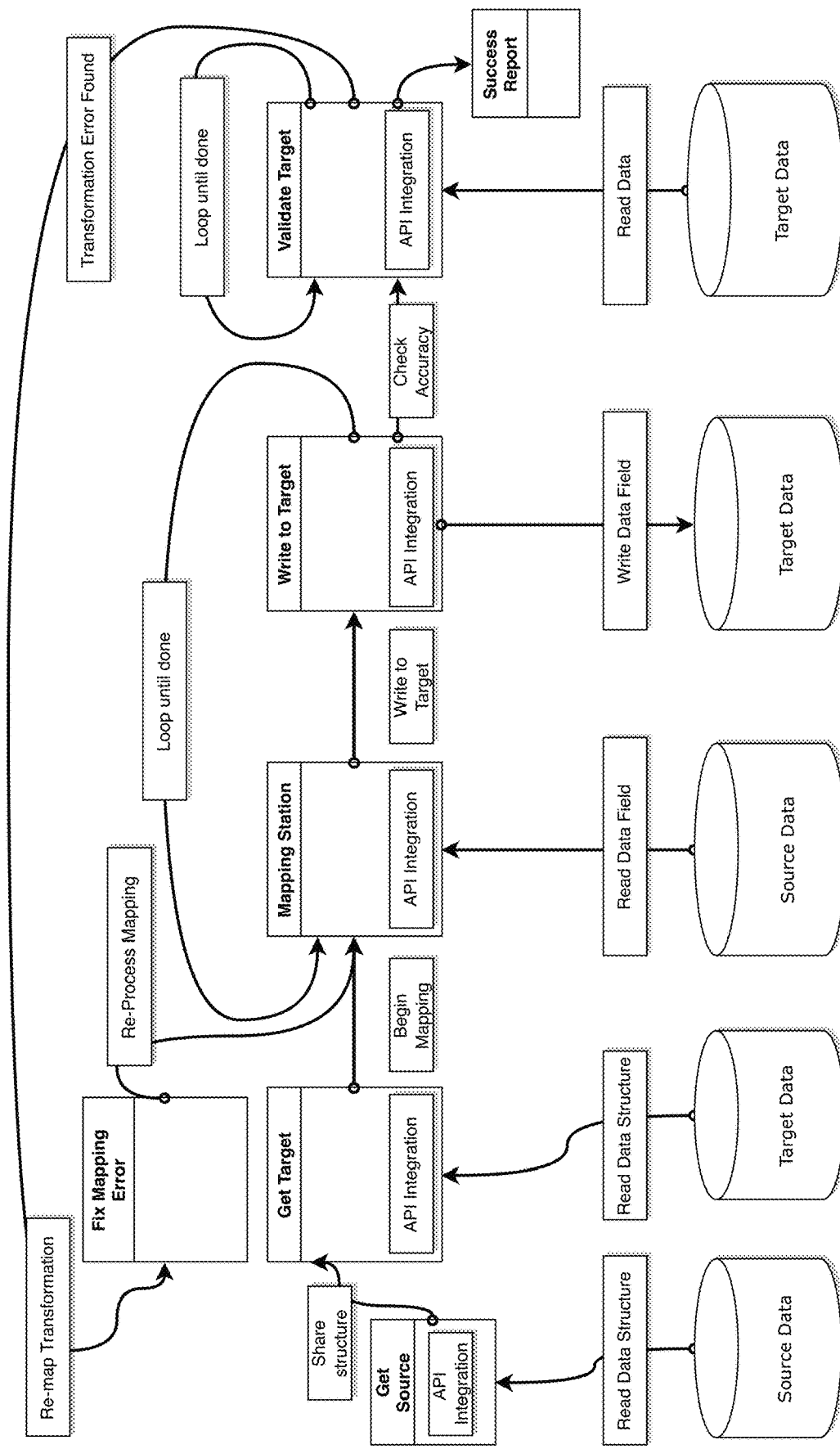
FIG. 22 illustrates example data integration using an external data integration model, coupled with internal and process triggers to demonstrate the viability of hybrid data integration processes, according to some embodiments.

Integration process flow, as part of both connecting to data sources and triggers, is made more extensible and flexible by bringing the data mapping integration into the DN. In FIG. 22, which shows an example data integration journey, advantages of orchestrating the process of data integration into the DN are shown with the various steps shown as part of this example. These advantages include, among others, reading a data structure from a source, building a map from a target, iterating through data transformations, verifying results, and publishing success reports. For example, a data structure or schema of a source system may be normalized so that the orchestrator can interpret the data model that is available for access. The orchestrator can build a mapping model in one or more stations to validate the format and content rules for each data element integrated into the DN. Because of the ability within the DN to iterate until done, or until a criterion is met, the same process flow, including any number of stations with unique flow logic can be used to address transformation, aggregation, and formula driven compilation of data to be integrated.

In some embodiments, an operator may establish stations or steps in the integration flow that involve a synchronous interaction with a human reviewer. Once the rules are finalized for a particular process, these human synchronous steps could be transitioned to automated steps. Another advantage shown in FIG. 22 relates to verifying results, such as algorithms, visual inspections, or even an external validation step that serves as the final quality or accuracy check to ensure the results on the integration are accurate. Based upon the results of this quality check, the process might correctively flow back to the mapping for refinement, or if deemed successful, on to the reporting next step. When successful, a report can be published in various manners through a status station that can alert or indicate via business metrics, the success of the data integration.

The DN may allow for remapping errors in process. For example, in the event of an error, a remapping or reconfiguration station flow can provide self-healing steps for the data transformation. The timing, including synchronous and asynchronous data integrations, can be managed via schedule integration or manual triggered data pulls (or writes) based upon the orchestration of the integration. In some embodiments, with integrations, imported data may undergo algorithmic transformation or even human directed analysis. With experience orchestration, an optional human component of the integration may afford a tailored interface to streamline the synchronous steps in integration. Because an integration may be managed by a segment of a decision network, all the power of logic, predictive analytics, machine learning and artificial intelligence can be blended into the steps to address any uncertainty or need to automate reliability.

Decision Connectivity

Decision connectivity describes the way stations are virtually or logically connected in the DN to achieve flow from state to state, and decision to decision. The virtual flowing of Containers is directional, although any station may flow to a down or upstream station based upon the logic criterion expressed in the Flow Logic, according to some embodiments. As will be appreciated, a Container logically flowing from one station to another may not involve any physical movement of the Container's underlying data. For example, each station may obtain (and/or write to) relevant portions or fields of a Container by reference to a shared stored copy of the Container's data, which may be local or remote to the computing system implementing a given station.

Station Connectivity

Figure 24:
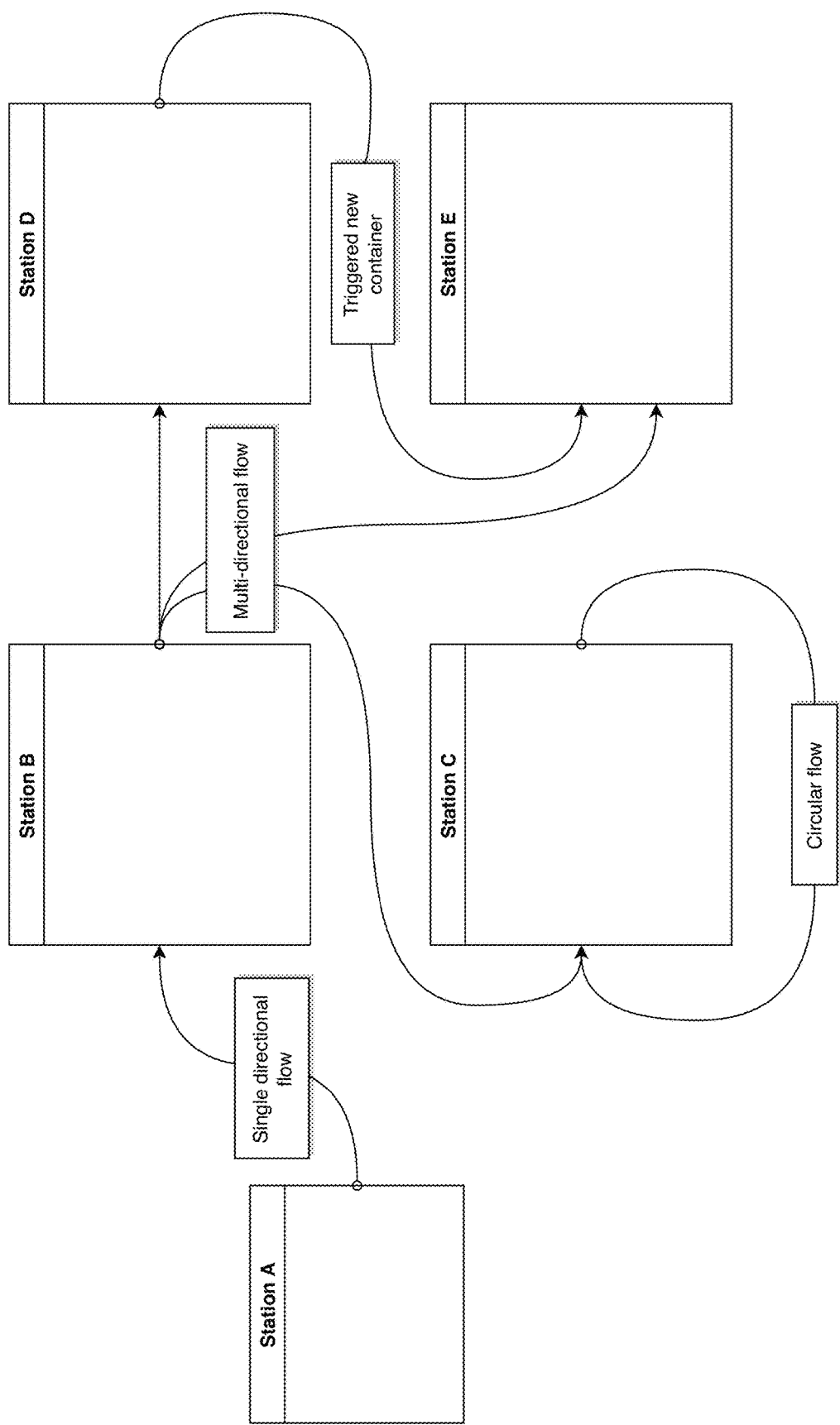
FIG. 24 illustrates example station-to-station connectivity options, including one-to-one, one-to-many, circular (same station to same station), and container/event trigger connections.

FIG. 24 shows different ways that station connections exist in the DN, including single flow, multi-directional, parallel flow, circular flow, and generational flow in the illustrated embodiment. A flow connection indicates that a Container is moving its state from one station to another. In some cases, this may mean the Container exists in multiple stations, or it may exclusively flow to any number of connected stations. Parallel connectivity indicates that the same Container is traversing parallel stations prior to reconnecting at a later station. Circular connections indicate a state where a Container might flow back to the same station to revisit the decisions and data analysis of the same station.

Parallel Connectivity

Figure 25:
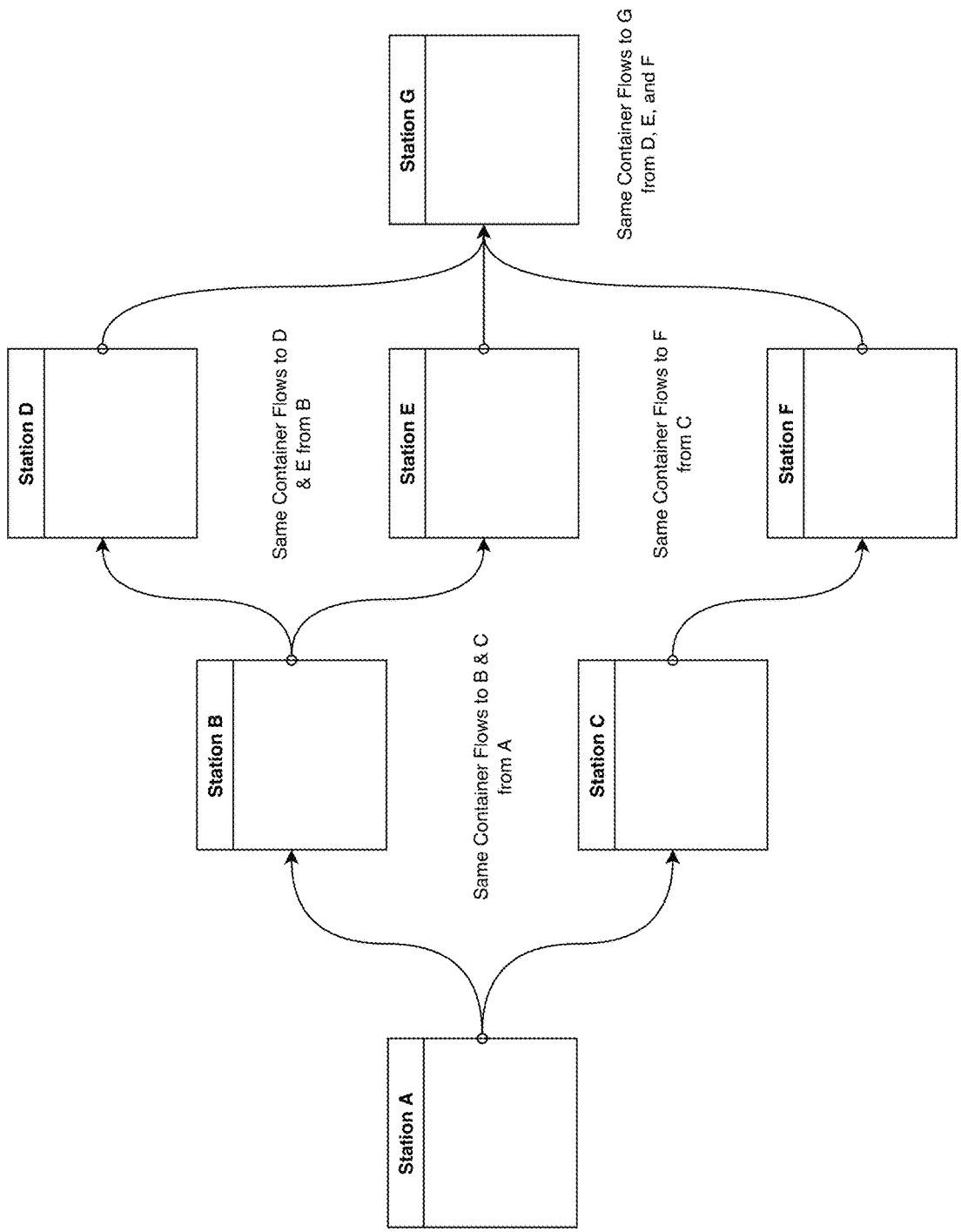
FIG. 25 illustrates example parallel connectivity, including how in a one-to-many connectivity model, stations can be connected to share an asynchronous connection to the same container throughout a complex number of stations, where the various instances of the container can remain separate or come back together in a consolidation station.

FIG. 25 shows that a single Container, in some embodiments, can traverse a number of stations, with different decisions applying to each stop, and then, when all criteria is met, come back together as a single Container with the full history, data model, and decision path aligned as meta data for that Container.

Container Generation Connectivity

Figure 26:
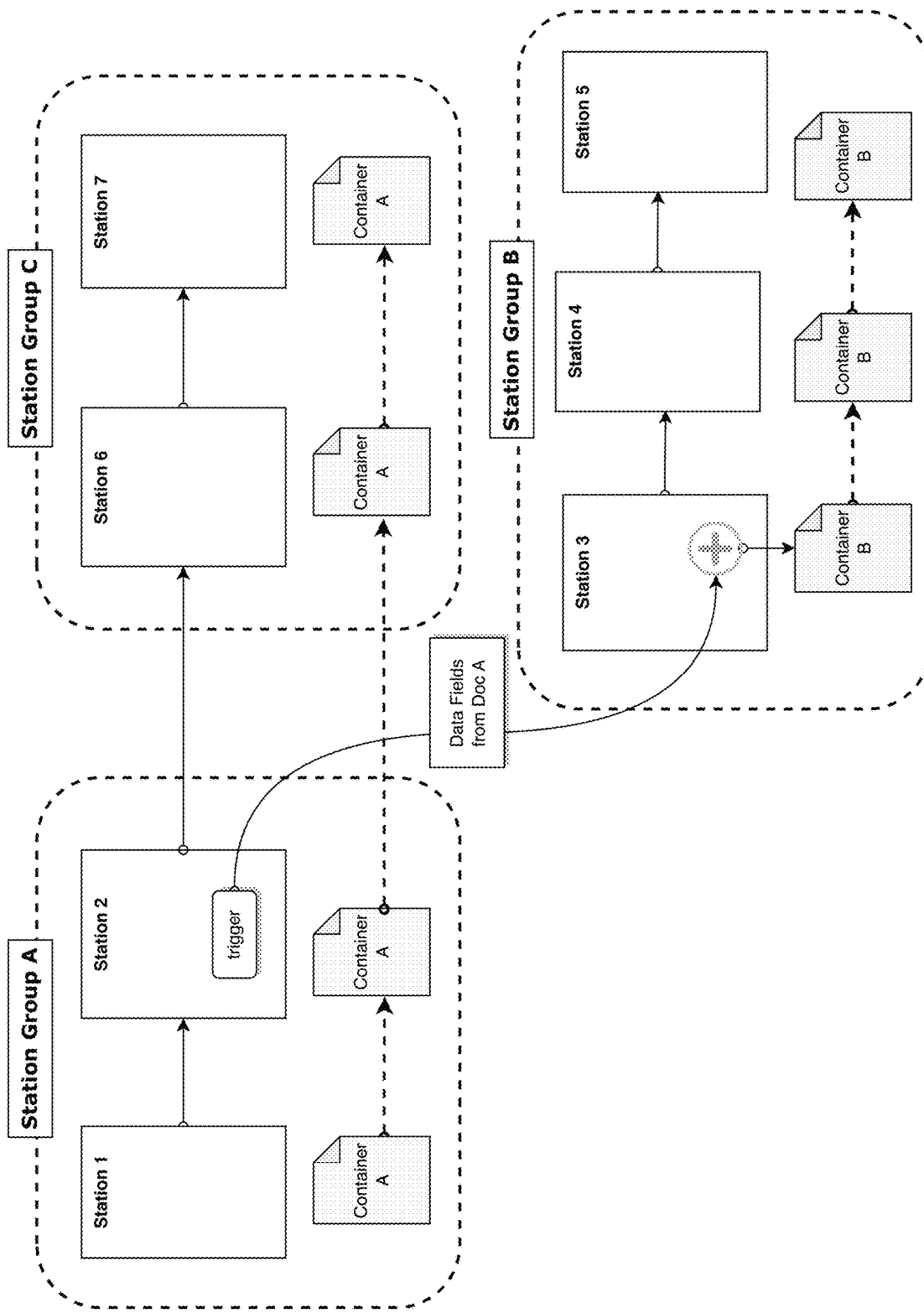
FIG. 26 provides an example container generation connectivity model showing how triggers within certain stations may be connected to stations for the purpose of generating a new container type, such that the new container may inherit exported data fields from the triggering station and containers that arrive there.

A unique type of connectivity illustrated in FIG. 26 shows that new Containers (either sibling, parent, child, or non-familial Containers) can be generated automatically by connecting a station to a Container generation station. In this case, the flow logic in the upstream station meets criteria to trigger the automatic creation of a new Container. This new Container can maintain its hierarchical relationship to the triggering Container as one of, for example: a sibling container (same level in the hierarchy), a parental container (a child container being created below the triggering Container), a child container (a new parent relationship is created with the triggering Container), or an unrelated container (e.g., though connected as the trigger, there is no hierarchical relationship).

In FIG. 26, Container A hits a triggering station (as Station 2) that causes Container B to be created, and Container A also continues to flow along its own decision pathway. In the given example, some critical data fields may be copied through inheritance to Container B. Container B then begins its own journey along its DN branch with its own intended purposes and outcomes.

Example Method for Station Configuration and Execution

Figure 23A:
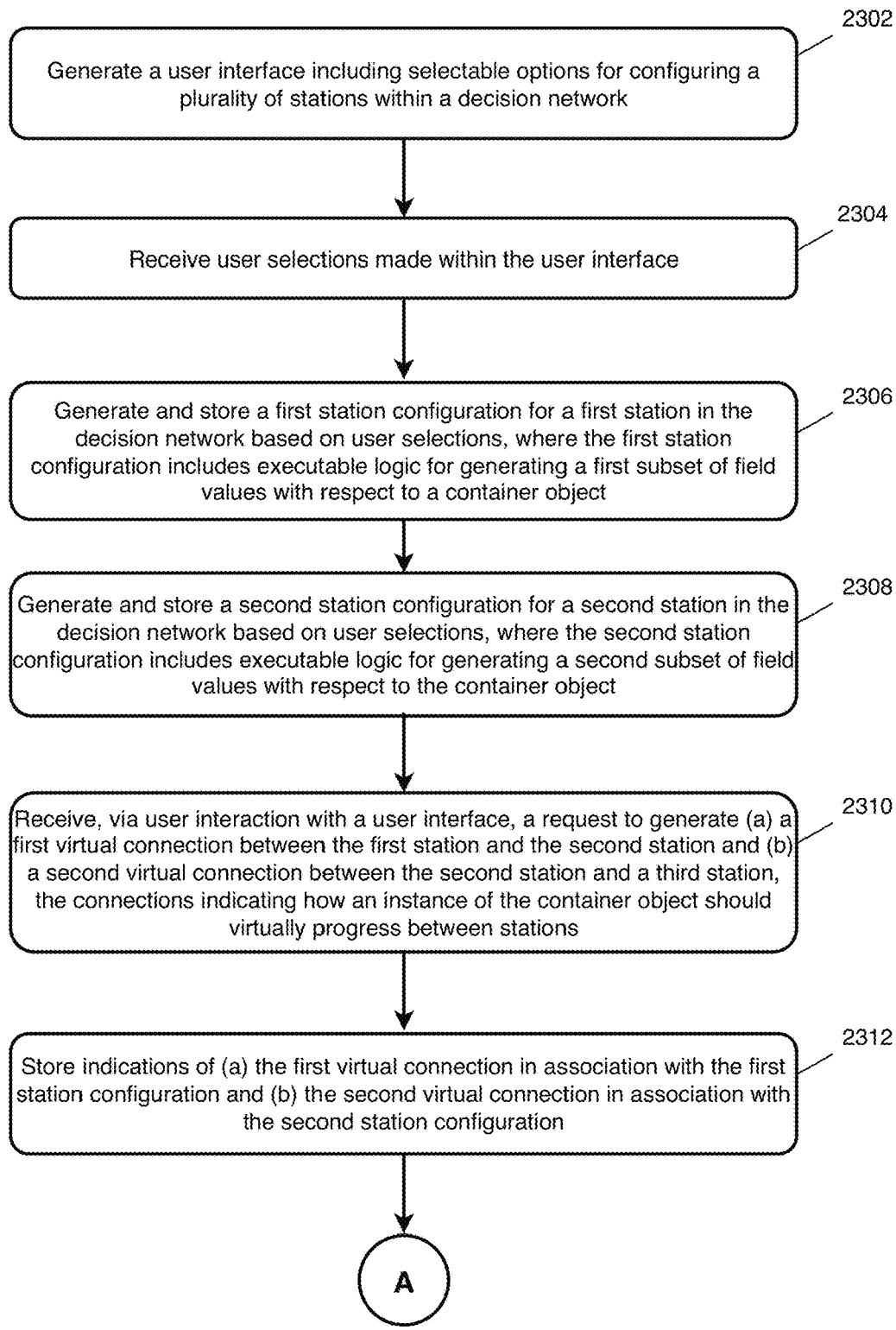
FIGS. 23A and 23B are flow charts of an illustrative method for configuring and implementing an instance of a decision network.
Figure 23B:
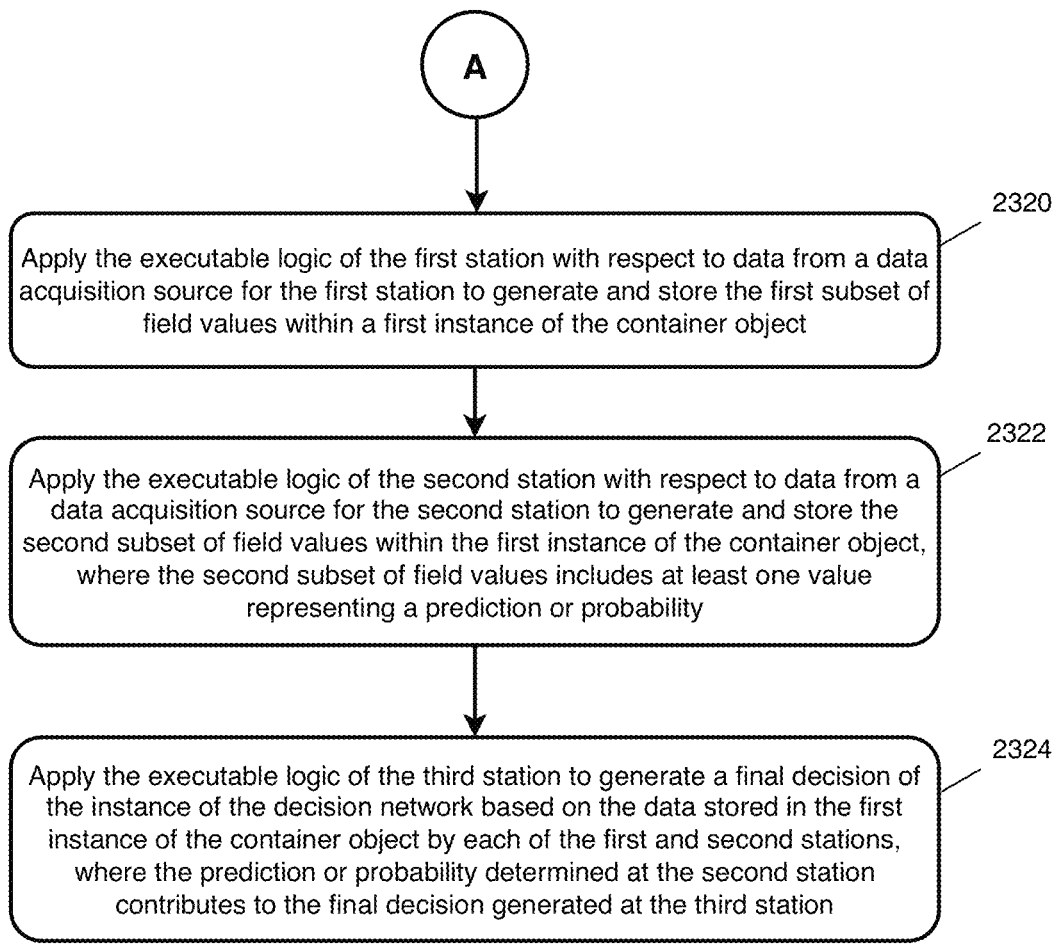

FIGS. 23A and 23B are flow charts of an illustrative method for configuring and implementing an instance of a decision network, according to some embodiments. The illustrative method of FIGS. 23A and 23B may be implemented by one or more computing systems, such as computing system 3302 described below with respect to FIG. 33. While steps of the method will be described as performed by computing system 3302, that is not intended to be limiting, and it will be appreciated that more than one computing system could implement the method.

The illustrative method of FIGS. 23 and 23B begins at block 2302, where the computing system 3302 may generate a user interface including selectable options for configuring a plurality of stations within a decision network. The user interface(s) generated may include user interfaces similar to those discussed below with respect to FIGS. 32A-32D. While such a user interface is displayed to a user, the computing system 3302 may, at block 2304, receive one or more user selections made within the user interface. The user selection(s) may include a user selection of an option to configure a first station of a decision network, such as by the user providing various configuration data and options discussed elsewhere herein. In response to the user selection, at block 2306 the computing system may generate and store a first station configuration for the first station in the decision network based on the user selections. The first station configuration may include executable logic for generating a first subset of field values with respect to a container object associated with the decision network, as discussed elsewhere herein. At block 2308, the system may generate and store a second station configuration for a second station in the decision network based on additional user selections via a user interface, where the second station configuration includes executable logic for generating a second subset of field values with respect to the container object. For example, the first station may be configured to access and/or generate data for different data fields of the same container object than the second station is configured to access and/or generate, though the two stations (and/or additional stations in the decision network) may have access to some of the same fields as each other.

At block 2310, the computing system 3302 may receive, via user interaction with a user interface, a request to generate both (a) a first virtual connection between the first station and the second station and (b) a second virtual connection between the second station and a third station. These connections may indicate to the computing system how an instance of the container object should virtually progress between stations, as further discussed herein. At block 2312, the computing system may then store indications of (a) the first virtual connection in association with the first station configuration and (b) the second virtual connection in association with the second station configuration.

Block 2320 of FIG. 23B may occur after block 2312 of FIG. 23A, though some time (e.g., hours or days, for example) may pass between blocks 2312 and 2320. For example, block 2320 of FIG. 23B may occur during the implementation or execution of an instance of the decision network after the decision network's configuration has been completed (as discussed with respect to FIG. 23A above). At block 2320, the computing system may apply the executable logic of the first station with respect to data from a data acquisition source for the first station to generate and store the first subset of field values within a first instance of the container object. The computing system may then pass the container instance to the second station according to established flow logic of the decision network. The system may then, at block 2322, apply the executable logic of the second station with respect to data from a data acquisition source for the second station to generate and store the second subset of field values within the first instance of the container object. In some embodiments, the second subset of field values may include at least one value representing a prediction or probability determined by the second station, as described elsewhere herein. The container may then logically move to the third station according to the flow logic of the network.

Lastly, at block 2324, the computing system may apply executable logic of the third station to generate a final decision of the instance of the decision network based on the data stored in the first instance of the container object by each of the first and second stations, where the prediction or probability determined earlier at the second station may contribute to the final decision generated at the third station. In this manner, data and decisions of earlier stations in the container's journey through the decision network have an effect on the outcome or ultimate decision of the network.

Station Groups—Abstraction of Complexity

As discussed above, decision networks described herein allow for substantial complexity of data, process, ownership, tasks, and ultimately decisions. Such complexity in certain instances of decision networks may not be well-suited for most individual contributors, and even supervisors and those with high level visibility may be overcome in the complexity. In order for a DN to achieve both its simplicity of structure and outcome, as well as encompassing many complex interactions leading to every nature of decision to be made, a convenient convention to abstract that complexity helps to achieve both outcomes.

The abstraction of complexity may be accomplished in some embodiments with an abstraction that may be referred to as a Station Group. Station Groups may allow for infinitely nested groups of stations designed to accomplish subprocesses within a higher level of process. Because these groups may be hierarchical, it allows the collapsing of sub-groups and only showing (such as in a user interface) the higher levels of the various groups of stations that are connected for an intended audience.

In some embodiments, Station Groups can be expanded and contracted easily in a visual representation of the DN structure. Default expansion levels may provide a tailored level of complexity for system users based upon their roles, personas, and/or tasks. A user can be provided an option for expanding down into the relevant station groups that require their attention or visibility. Security and access rules may also allow for the pruning or abstracting of decision network processes and branches that allows for people to only see what is relevant to them.

In some embodiments, users may choose to use (such as via a user interface) any variety of metadata filtering to expose and hide irrelevant station groups from their view. This allows individuals to systematically show any variety of structure they care about with simple search parameters. For example, a user may select to view only Station Groups that (a) the user has access to, (b) has a task assigned to the user, (c) are within a certain team or department, (d) include certain naming conventions, and/or (e) are expanded or contracted to a certain level within the hierarchy, among others in other embodiments.

One way of filtering abstractions may be to choose a personal center of a given DN structure. This allows a user to abstract everything from the center of their own domain and create less clutter from the complexity of the entire network. Users may, in some embodiments, choose more than one center for their DN and be able to jump from one center to the next without having to filter or compress the litany of Station Groups to which they are attached.

Example User Experience and Interfaces

Figure 32A:
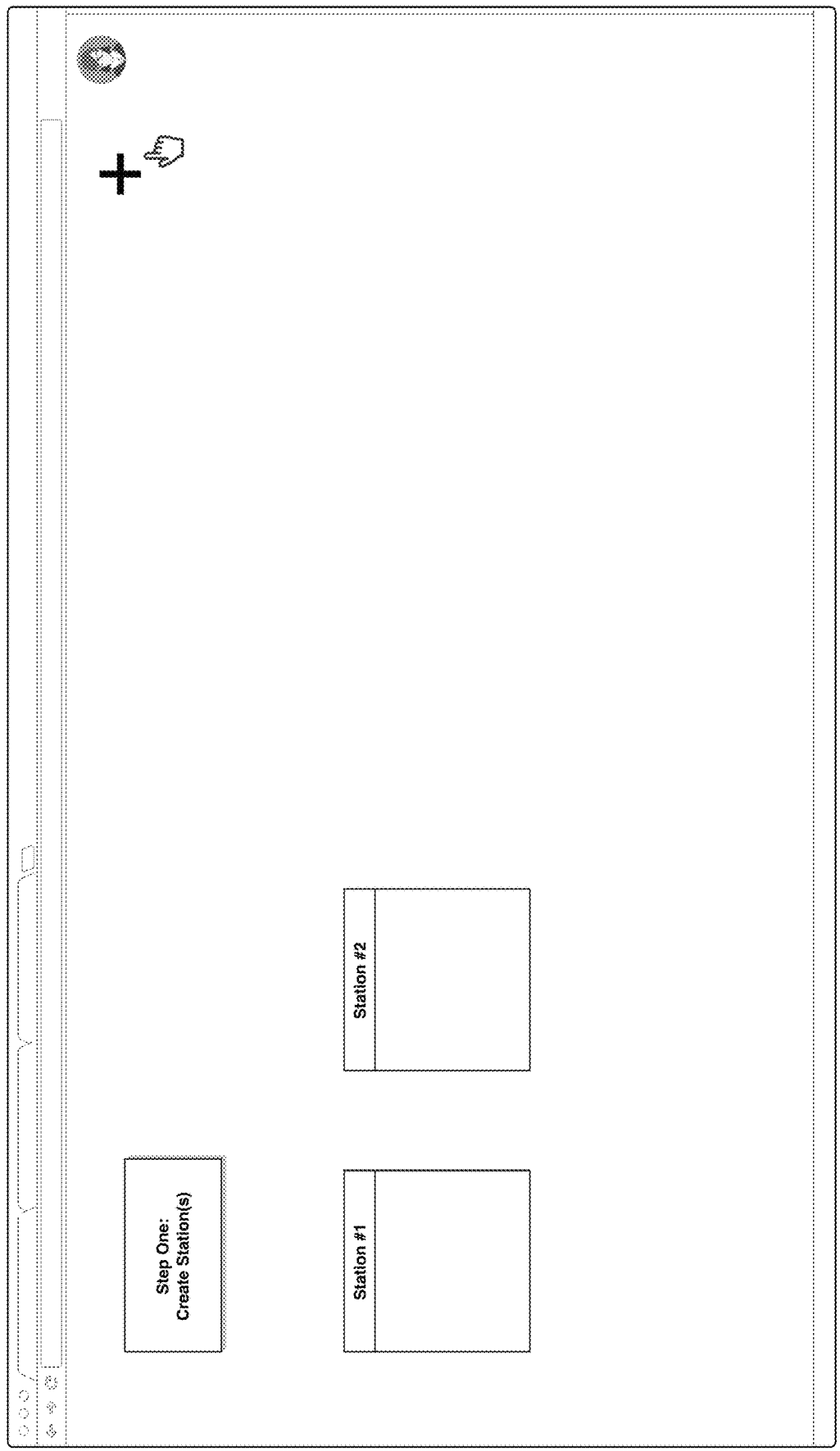
FIGS. 32A-32E provide a series of example user interfaces for enabling a user to configure a decision network that includes multiple stations, according to some embodiments.
Figure 32B:
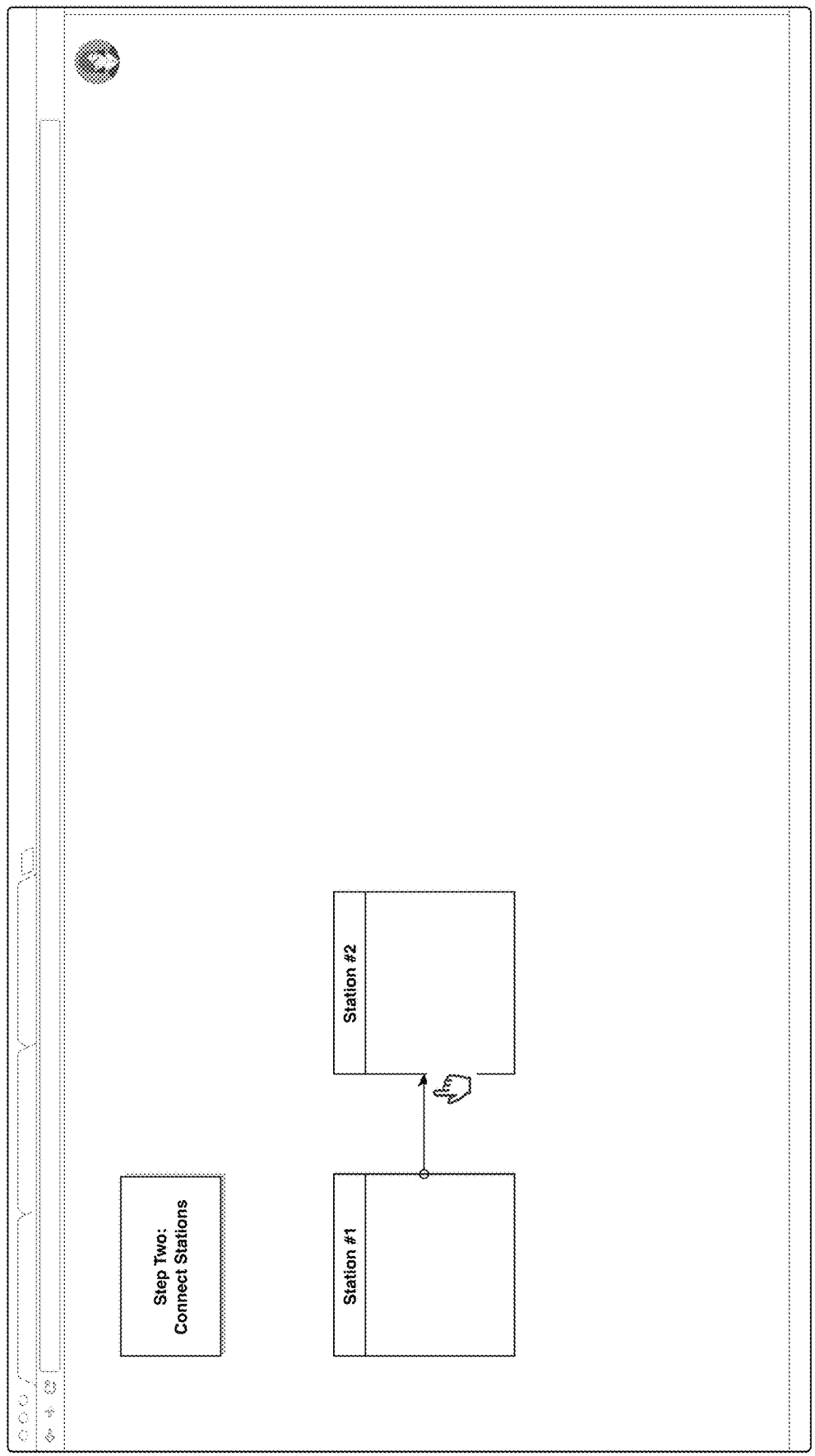
Figure 32C:
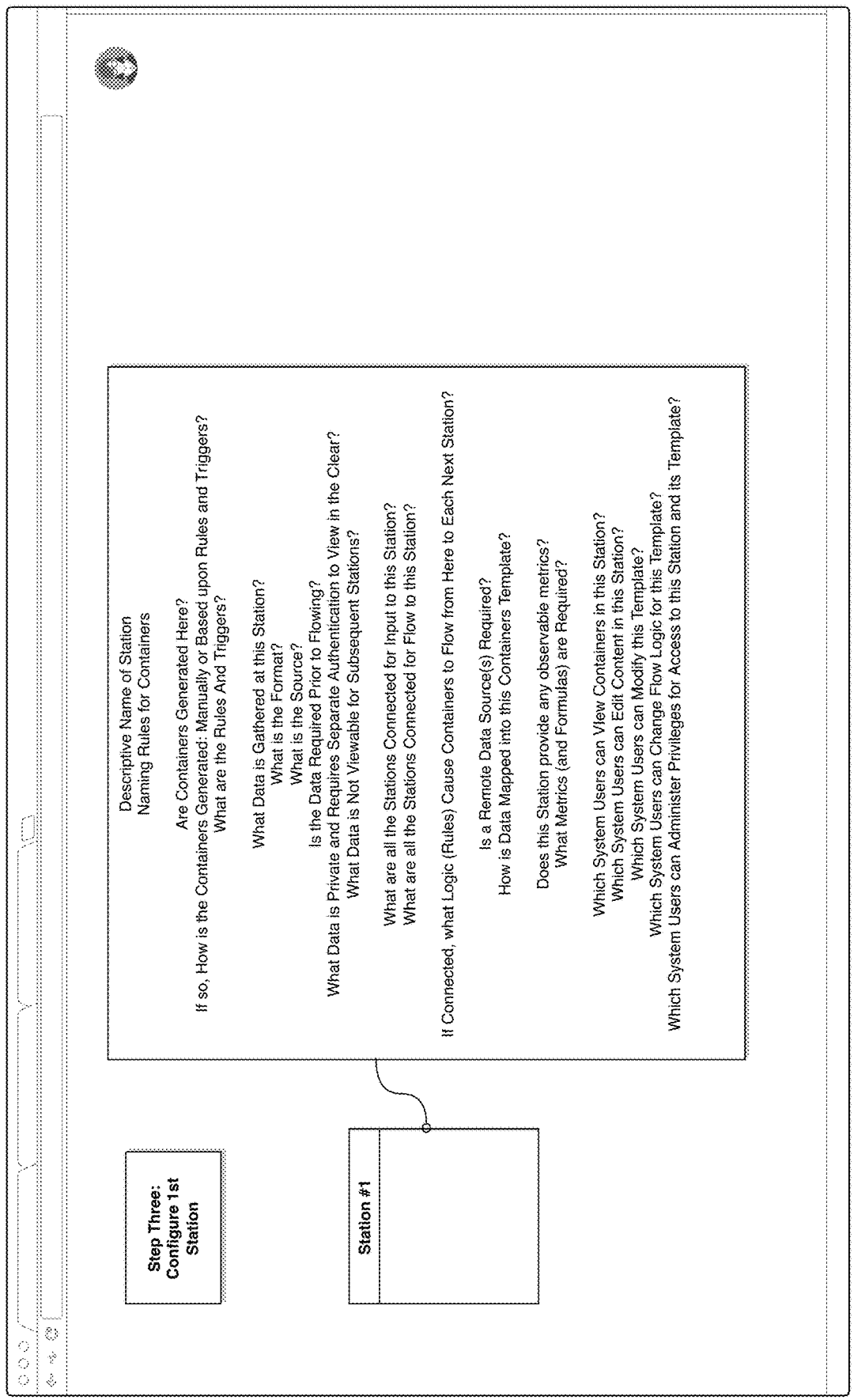
Figure 32D:
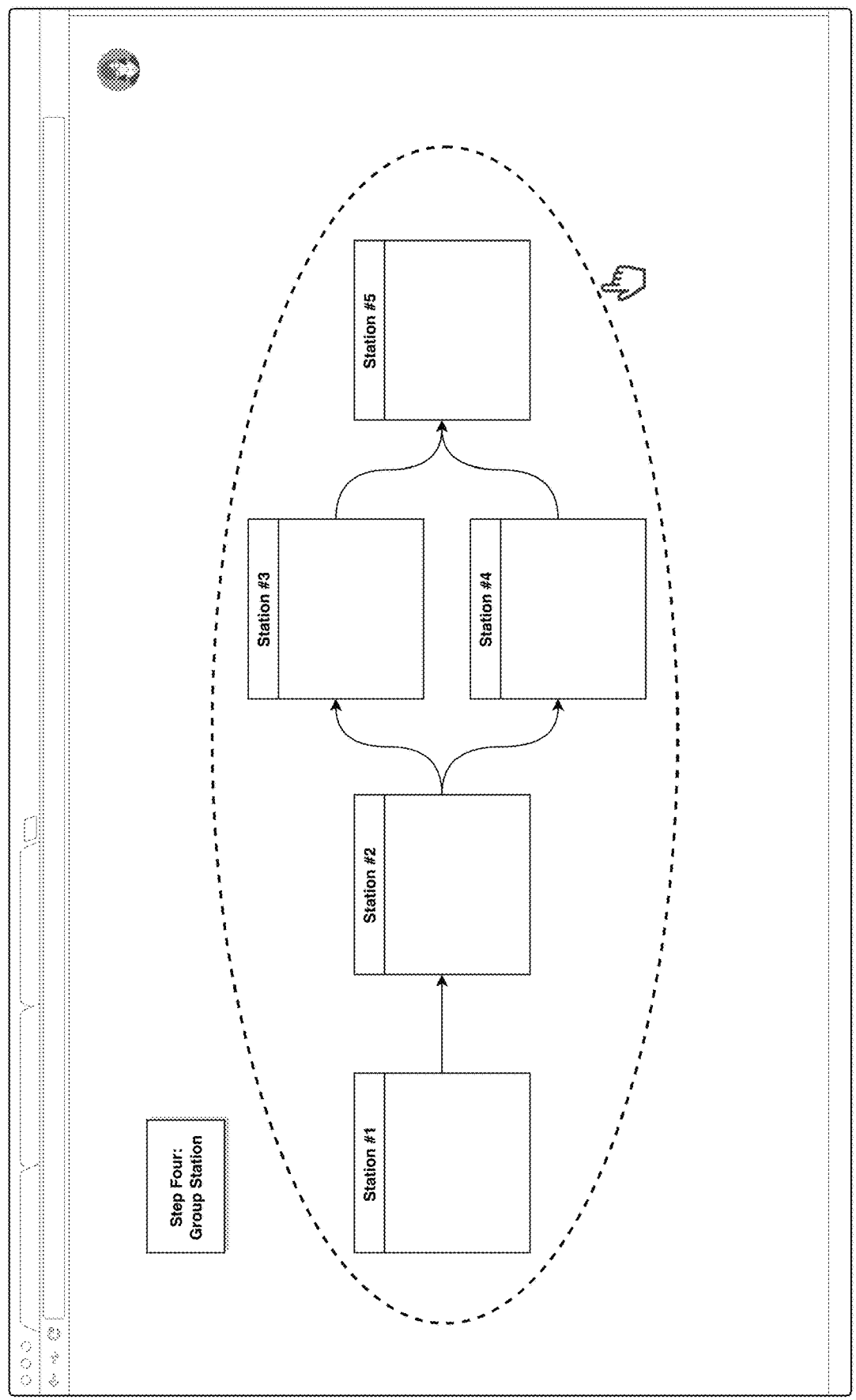
Figure 32E:
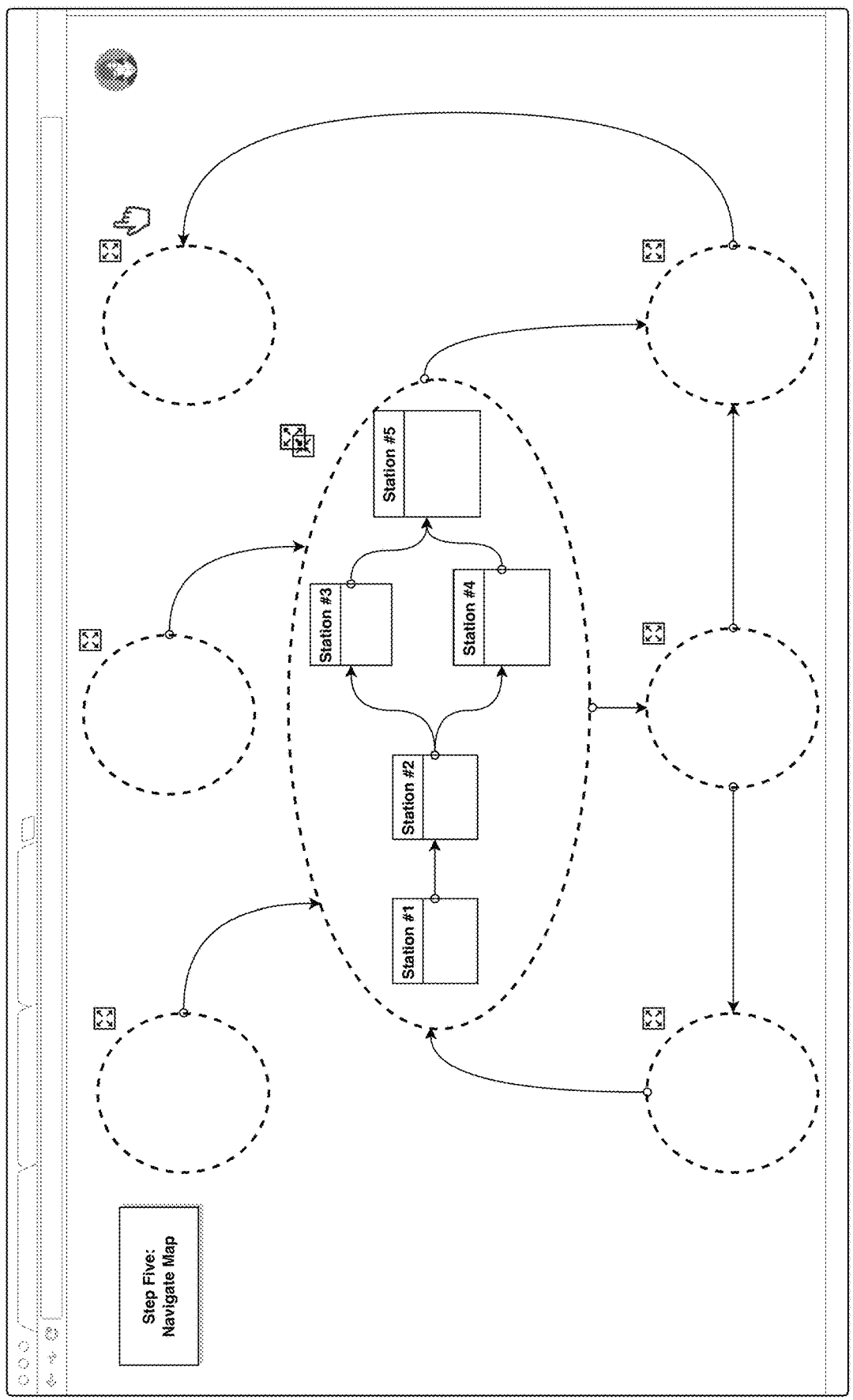

FIGS. 32A-32E provide a series of example user interfaces for enabling a user to configure a decision network that includes multiple stations, according to some embodiments. The steps performed by the user via the user interfaces of FIGS. 32A-32E include (1) creating new stations (FIG. 32A), (2) connecting stations (FIG. 32B), (3) configuring individual stations (FIG. 32C), (4) grouping stations (FIG. 32D), and optionally navigating the map (FIG. 32E).

As discussed above, each station encapsulates logic for the decision nodes of the Decision Network. Each user that is authorized to build part of the network can be enabled to add these individual stations. FIG. 32A provides an example user interface in which a user may select to create one or more new stations. The user that created the stations, or any authorized user can then visually connect stations, such as via a user interface as shown in FIG. 32B. Stations can be connected to any other station, meaning decisions flow along from station to station in the form of a Container or meta data container. In FIG. 32B, a user has selected to create a connection flowing from Station #1 to Station #2, such as by a dragging motion (such as by touch gesture on a touchscreen or movement of a cursor) between the stations' icons.

Once stations are connected, an authorized user can configure each station, such as via user interface similar to that shown in FIG. 32C. As a template for containing meta data about the flow of decisions across its connected nodes, the station template contains any number of attributes including data and related properties of that data, logic that dictates how decisions are made and how they flow to other stations, connections to external and internal sources of data, observable analytics, and user resources authorized to have varying degrees of access privilege, from viewing to administrative. While FIG. 32C describes a number of prompts or fields to be completed by the user, it will be appreciated that a number of different input methods and user interface options may be presented in sequence after the initial prompt in FIG. 32C to facilitate data gathering from the user in configuring a station.

Stations can be grouped into logical sibling processes or nodes, such as via a grouping user interface as shown in FIG. 32D. This allows for the abstraction through collapsing and expanding the station group unit. Another benefit of station grouping is administering access and attributes into a logical collection of like steps. These groups may have their own access administration and naming convention to increase simplicity and uniformity of process. Each group could represent its own process, own team, or organizational unit, and can house not only a collection of stations, but other collections of station groups. This ability to hierarchically manage greater complexity allows for many benefits like hierarchical administration of access, simplified data sharing, and a narrowed user experience for collaborators.

Once a map of the organizational decision network is published, users can navigate based upon their access level around all the structures that are within their individual purview of the network, zooming in/out and panning around to identify the connections and layout. An example user interface for such navigation is shown in FIG. 32E. By drilling into individual stations, users can see the data and rules that lead to making the decisions that drive the utility of the network.

Viewing the map of the decision network allows for understanding and refinement of the decision process. Though working and in full use, the structure may always be evolving as it is improved to provide more relevant and profitable outcomes.

Figure 33:
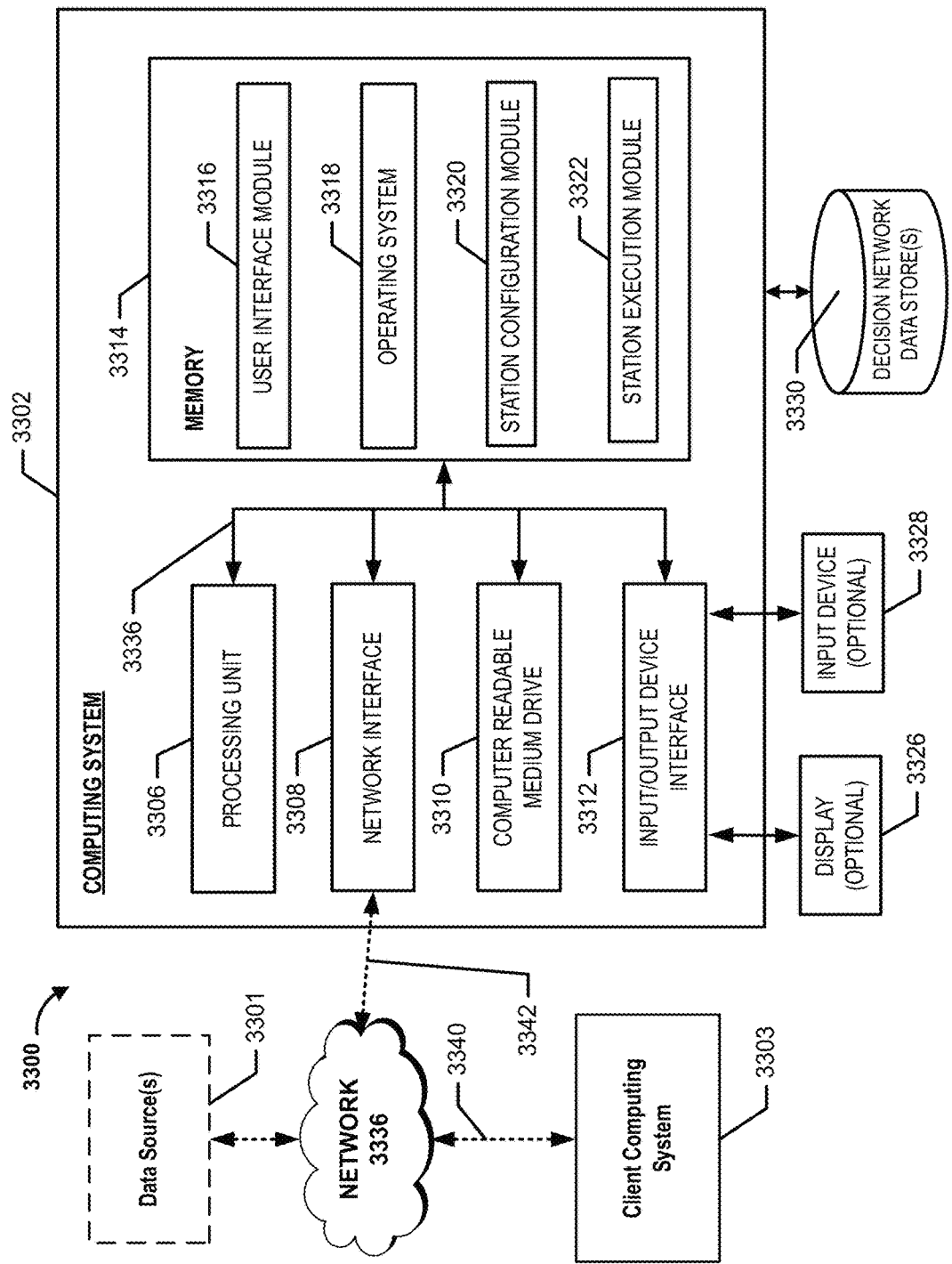
FIG. 33 is a system block diagram of a computing system suitable for use in various embodiments of the present disclosure.

FIG. 33 illustrates a general architecture of a computing environment 3300, according to some embodiments. As depicted in FIG. 33, the computing environment 3300 may include a computing system 3302. The general architecture of the computing system 3302 may include an arrangement of computer hardware and software components used to implement aspects of the present disclosure. The computing system 3302 may include many more (or fewer) elements than those shown in FIG. 33. It is not necessary, however, that all of these generally conventional elements be shown in order to provide an enabling disclosure. In some embodiments, the computing system 3302 may implement or execute each station in a decision network, as well as provide user interfaces for administrative users to configure stations. In other embodiments, the computing system 3302 may implement or execute one station or a subset of the stations in a decision network, while other computing systems (such as other systems with similar components to computing system 3302) may implement or execute other stations of the same decision network and may communicate with one another via the network 3336.

As illustrated, the computing system 3302 includes a processing unit 3306, a network interface 3308, a computer readable medium drive 3310, an input/output device interface 3312, an optional display 3326, and an optional input device 3328, all of which may communicate with one another by way of a communication bus 3336. The processing unit 3306 may communicate to and from memory 3314 and may provide output information for the optional display 3326 via the input/output device interface 3312. The input/output device interface 3312 may also accept input from the optional input device 3328, such as a keyboard, mouse, digital pen, microphone, touch screen, gesture recognition system, voice recognition system, or other input device known in the art.

The memory 3314 may contain computer program instructions (grouped as modules or components in some embodiments) that the processing unit 3306 may execute in order to implement one or more embodiments described herein. The memory 3314 may generally include RAM, ROM and/or other persistent, auxiliary or non-transitory computer-readable media. The memory 3314 may store an operating system 3318 that provides computer program instructions for use by the processing unit 3306 in the general administration and operation of the computing system 3302. The memory 3314 may further include computer program instructions and other information for implementing aspects of the present disclosure. For example, in one embodiment, the memory 3314 may include a user interface module 3316 that generates user interfaces (and/or instructions therefor) for display upon a computing system, e.g., via a navigation interface such as a browser or application installed on the computing system 3302 or a client computing system 3303.

In some embodiments, the memory 3314 may include a station configuration module 3320 and station execution module 3322, which may be executed by the processing unit 3306 to perform operations according to various embodiments described herein. The modules 3320 and/or 3322 may access decision network data store(s) 3330 in order to retrieve data described above and/or store data, such as station configuration data and/or container data. The data store(s) 3330 may be part of the computing system 3302, remote from the computing system 3302, and/or may be a network-based service.

In some embodiments, the network interface 3308 may provide connectivity to one or more networks or computing systems, and the processing unit 3306 may receive information and instructions from other computing systems or services via one or more networks. In the example illustrated in FIG. 33, the network interface 3308 may be in communication with a client computing system 3303 via the network 3336, such as the Internet. In particular, the computing system 3302 may establish a communication link 3342 with a network 3336 (e.g., using known protocols) in order to send communications to the client computing system 3303 over the network 3336. Similarly, the client computing system 3303 may send communications to the computing system 3302 over the network 3336 via a wired or wireless communication link 3340. In some embodiments, the computing system 3302 may additionally communicate via the network 3336 with optional external data source(s) 3301, which may be used by the computing system 3302 to retrieve data as discussed herein.

Those skilled in the art will recognize that the computing systems 3302 and 3303 may be any of a number of computing systems including, but not limited to, a laptop, a personal computer, a personal digital assistant (PDA), a hybrid PDA/mobile phone, a mobile phone, a smartphone, a tablet computer, a gaming console or controller, a kiosk, an augmented reality device, another wireless device, a set-top or other television box, one or more servers, and the like. The client computing system 3303 may include similar hardware to that illustrated as being included in computing system 3302, such as a display, processing unit, network interface, memory, operating system, etc. In some embodiments, the client computing system 3303 may perform various steps described herein based in part on a browser or other application operating on the client computing system 3303 executing code received over the network from the computing system 3302 and/or other network-accessible server or service.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   one or more processors in communication with the memory and configured with processor-executable instructions to perform operations comprising:
   configuring a decision network, wherein configuring the decision network comprises:
   generating a user interface comprising selectable options for configuring a plurality of stations within the decision network;
   based at least in part on user selections made within the user interface, generating and storing a first station configuration for a first station in the decision network, wherein the first station configuration identifies each of at least: one or more data fields associated with a container object, access restrictions associated with the first station, at least one data acquisition source for the first station, and executable logic for generating a first subset of field values with respect to the container object;
   generating and storing a second station configuration for a second station in the decision network, wherein the second station configuration includes executable logic for generating a second subset of field values with respect to the container object;
   receiving, via user interaction with at least one user interface, a request to generate (a) a first virtual connection between the first station and the second station and (b) a second virtual connection between the second station and a third station, wherein the first and second virtual connections indicate to a computing system that instances of the container object should virtually move from the first station to the second station to the third station during operation of the decision network; and
   storing indications of (a) the first virtual connection in association with the first station configuration and (b) the second virtual connection in association with the second station configuration; and
   executing an instance of the decision network, wherein executing the instance of the decision network comprises:
   applying the executable logic of the first station with respect to data from the at least one data acquisition source for the first station to generate and store the first subset of field values within a first instance of the container object;
   subsequent to modification of the first instance of the container object by the first station, applying the executable logic of the second station with respect to data from the at least one data acquisition source for the second station to generate and store the second subset of field values within the first instance of the container object, wherein the second subset of field values include at least one value representing a prediction or probability determined based on data accessible to the second station; and
   applying executable logic of the third station to generate a final decision of the instance of the decision network based on the data stored in the first instance of the container object by each of the first and second stations, wherein the prediction or probability determined at the second station contributes to the final decision generated at the third station.

2. The computer system of claim 1, wherein the prediction or probability determined at the second station is determined based at least in part on application of Bayes' law to: (a) data in one or more of the first subset of field values stored within the first instance of the container object by the first station and (b) data from the at least one data acquisition source for the second station.

3. The computer system of claim 1, wherein the user interface further enables a user to select fields from the container object that should be treated at one or more stations as causally related to an outcome to be predicted within the decision network.

4. The computer system of claim 1, wherein the first instance of the container object is physically stored in a single storage location along with a location attribute identifying one or more stations at which the first instance of the container object virtually resides at a current time.

5. The computer system of claim 1, wherein the decision network is configured to connect via a secure connection to a second decision network operated by a different entity than the decision network, wherein the secure connection supports encrypted data sharing.

6. The computer system of claim 1, wherein the user interface enables a user to select two or more stations to be associated with one another as a station group.

7. The computer system of claim 6, wherein the user interface includes an option to expand or collapse a view of the station group within the user interface.

8. The computer system of claim 1, wherein the operations further comprise identifying occurrence of an event associated with a process trigger that causes the first instance of the container object to virtually move from the first station to the second station.

9. The computer system of claim 8, wherein the event is received from a sensor external to the decision network.

10. The computer system of claim 8, wherein the event is internal to the decision network and relates to data stored in the first instance of the container object.

11. A computer-implemented method comprising:
as implemented by one or more computing devices configured with specific executable instructions,
configuring a decision network, wherein configuring the decision network comprises:
generating a user interface comprising selectable options for configuring a plurality of stations within the decision network;
based at least in part on user selections made within the user interface, generating and storing a first station configuration for a first station in the decision network, wherein the first station configuration identifies each of at least: one or more data fields associated with a container object, at least one data acquisition source for the first station, and executable logic for generating a first subset of field values with respect to the container object;
generating and storing a second station configuration for a second station in the decision network, wherein the second station configuration includes executable logic for generating a second subset of field values with respect to the container object;
receiving, via user interaction with at least one user interface, a request to generate (a) a first virtual connection between the first station and the second station and (b) a second virtual connection between the second station and a third station, wherein the first and second virtual connections indicate to a computing system that instances of the container object should virtually move from the first station to the second station to the third station during operation of the decision network; and
storing indications of (a) the first virtual connection in association with the first station configuration and (b) the second virtual connection in association with the second station configuration; and
executing an instance of the decision network, wherein executing the instance of the decision network comprises:
applying the executable logic of the first station with respect to data from the at least one data acquisition source for the first station to generate and store the first subset of field values within a first instance of the container object;
subsequent to modification of the first instance of the container object by the first station, applying the executable logic of the second station with respect to data from the at least one data acquisition source for the second station to generate and store the second subset of field values within the first instance of the container object, wherein the second subset of field values include at least one value representing a prediction or probability determined based on data accessible to the second station; and
applying executable logic of the third station to generate a final decision of the instance of the decision network based on the data stored in the first instance of the container object by each of the first and second stations, wherein the prediction or probability determined at the second station contributes to the final decision generated at the third station.

12. The computer-implemented method of claim 11, wherein applying the executable logic of the first station is performed by a first computing device, and wherein applying the executable logic of the second station is performed by the first computing device.

13. The computer-implemented method of claim 11, wherein applying the executable logic of the first station is performed by a first computing device, and wherein applying the executable logic of the second station is performed by a second computing device that is physically remote from the first computing device.

14. The computer-implemented method of claim 11, wherein the prediction or probability determined at the second station is determined based at least in part on application of Bayes' law to: (a) data in one or more of the first subset of field values stored within the first instance of the container object by the first station and (b) data from the at least one data acquisition source for the second station.

15. The computer-implemented method of claim 14, wherein generating the prediction or probability at the second station further comprises determining a posterior distribution based at least in part on data stored in the first instance of the container object.

16. The computer-implemented method of claim 11, wherein the first station configuration includes flow logic and predictive logic to be applied at the first station.

17. The computer-implemented method of claim 11, further comprising merging two or more field values, of the first instance of the container object, that were determined at two or more different stations.

18. The computer-implemented method of claim 11, wherein the first instance of the container object is based on a container template, wherein the first instance of the container object is generated from the container template based in part on two or more of: a persona, a visibility rule, an ordered layout, or an editable rule.

* * * * *